United States Patent
Asano et al.

(10) Patent No.: US 7,208,242 B2
(45) Date of Patent: *Apr. 24, 2007

(54) SOLID POLYMER TYPE FUEL CELL

(75) Inventors: Yoichi Asano, Wako (JP); Masaaki Nanaumi, Wako (JP); Hiroshi Sohma, Wako (JP); Nagayuki Kanaoka, Wako (JP); Nobuhiro Saito, Wako (JP); Keisuke Andou, Wako (JP); Kaoru Fukuda, Wako (JP); Junji Matsuo, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 580 days.

This patent is subject to a terminal disclaimer.

(21) Appl. No.: 10/473,388

(22) PCT Filed: Apr. 1, 2002

(86) PCT No.: PCT/JP02/03256

§ 371 (c)(1),
(2), (4) Date: Sep. 30, 2003

(87) PCT Pub. No.: WO02/080294

PCT Pub. Date: Oct. 10, 2002

(65) Prior Publication Data

US 2004/0121211 A1 Jun. 24, 2004

(30) Foreign Application Priority Data

| Mar. 30, 2001 | (JP) | ............................ 2001-097801 |
| Mar. 30, 2001 | (JP) | ............................ 2001-097803 |
| Mar. 30, 2001 | (JP) | ............................ 2001-097804 |
| Mar. 30, 2001 | (JP) | ............................ 2001-097805 |
| Mar. 30, 2001 | (JP) | ............................ 2001-097806 |
| Apr. 5, 2001  | (JP) | ............................ 2001-106648 |

(51) Int. Cl.
H01M 8/10 (2006.01)

(52) U.S. Cl. .......................................... 429/33; 429/46

(58) Field of Classification Search .................. 429/33, 429/42, 44, 32, 46
See application file for complete search history.

(56) References Cited

U.S. PATENT DOCUMENTS 5,438,082 A * 8/1995 Helmer-Metzmann et al. .......................... 522/149

FOREIGN PATENT DOCUMENTS

JP 09087510 A * 3/1997

* cited by examiner

Primary Examiner—Gregg Cantelmo
(74) Attorney, Agent, or Firm—Arent Fox, PLLC.

(57) ABSTRACT

The present invention provides a polymer electrolyte fuel cell, which is inexpensive and has an excellent efficiency of generating electric power, by using a material alternative to a perfluoroalkylene sulfonic acid polymer. The polymer electrolyte fuel cell comprises a pair of electrodes (2, 3) consisting of an oxygen electrode (2) and a fuel electrode (3) both having a catalyst layer (5) containing a catalyst and an ion conducting material; and a polymer electrolyte membrane (1) sandwiched between the two catalyst layers (5) of the both electrodes (2, 3). The above ion conducting material contained in the above polymer electrolyte membrane (1) or in the catalyst (5) layer of at least one of the above electrodes (2, 3) comprises a sulfonated polyarylene having sulfonic acid side-chain groups.

40 Claims, 12 Drawing Sheets

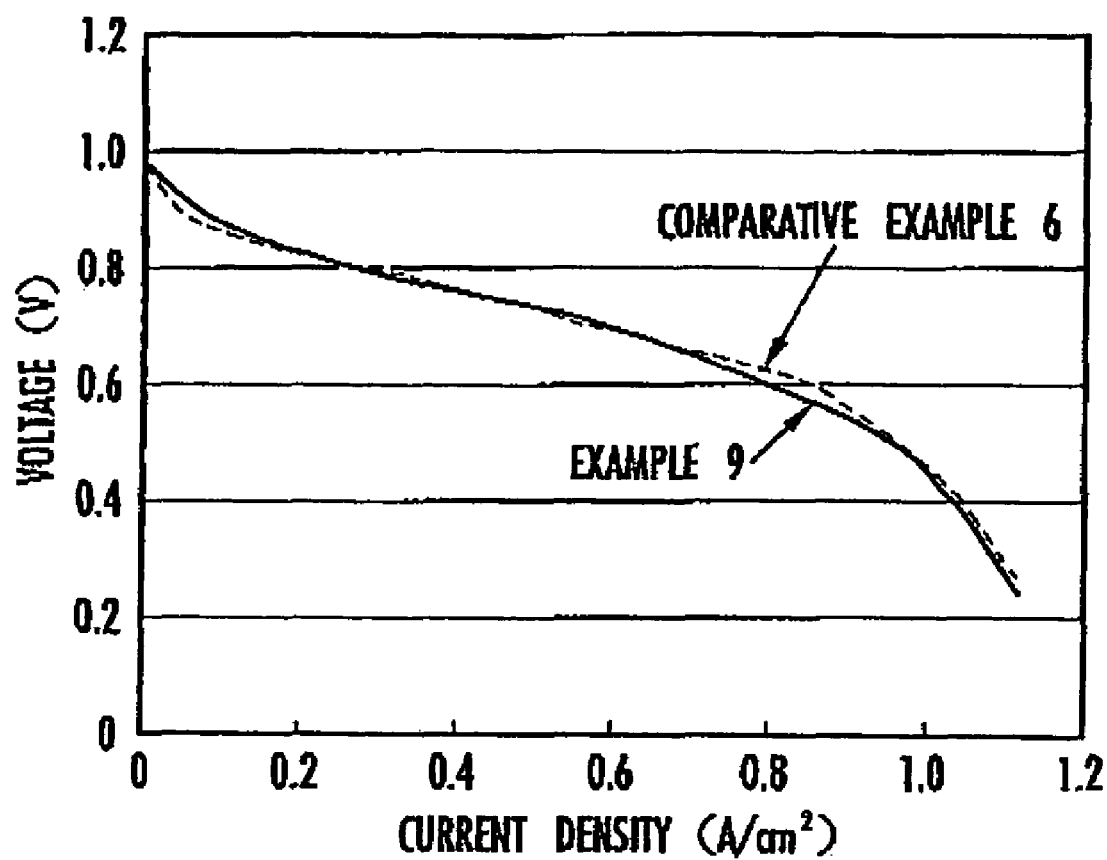

SOLID POLYMER TYPE FUEL CELL

TECHNICAL FIELD

The present invention relates to a polymer electrolyte fuel cell comprising a polymer electrolyte membrane.

BACKGROUND ART

The petroleum source is drying up, and at the same time, environmental problems such as global warming from consumption of fossil fuel have increasingly become serious. Thus, a fuel cell receives attention as a clean power source for electric motors that is not accompanied with the generation of carbon dioxide. The above fuel cell has been widely developed, and some fuel cells have become commercially practical. When the above fuel cell is mounted in vehicles and the like, a polymer electrolyte fuel cell comprising a polymer electrolyte membrane is preferably used because it easily provides a high voltage and a large electric current.

The above polymer type fuel cell comprises a pair of electrodes consisting of a fuel electrode and an oxygen electrode, and a polymer electrolyte membrane capable of conducting ions, which is located between the electrodes. Each of the above fuel and oxygen electrodes has a backing layer and a catalyst layer, and the above polymer electrolyte membrane is sandwiched between the above catalyst layers of both the electrodes. The above catalyst layer comprises catalyst particles that are formed by unifying by ion conducting binders, catalysts such as Pt supported by catalyst carriers.

When reducing gas such as hydrogen or methanol is introduced into the fuel electrode of the above polymer electrolyte fuel cell, the above reducing gas reaches the above catalyst layer through the above backing layer, and protons are generated by the action of the above catalyst. The protons transfer from the above catalyst layer to the catalyst layer of the above oxygen electrode through the above polymer electrolyte membrane.

When oxidizing gas such as air or oxygen is introduced into the above oxygen electrode while introducing the above reducing gas into the above fuel electrode, the above protons are reacted with the above oxidizing gas by the action of the above catalyst in the catalyst layer on the side of the above oxygen electrode, so as to generate water. Thus, electric current is obtained by connecting the fuel electrode with oxygen electrode by a conductor.

Previously, in the polymer electrolyte fuel cells, a perfluoroalkylene sulfonic acid polymer (e.g., Nafion (product name) manufactured by DuPont) has been widely used for the above polymer electrolyte membrane and the ion conducting binder in the above catalyst layer. The perfluoroalkylene sulfonic acid polymer is sulfonated, and accordingly it has an excellent proton conductivity. Moreover, the compound also has a chemical resistance as a fluorocarbon resin. However, the compound has a problem in that it is extremely expensive.

Thus, in recent years, a low-priced material that does not contain fluorine in its molecular structure or contains a reduced amount of fluorine has been proposed. For example, the specification of the U.S. Pat. No. 5,403,675 discloses a polymer electrolyte membrane comprising sulfonated rigid polyphenylene. The sulfonated rigid-rod polyphenylene described in the above specification is obtained by reacting a polymer obtained by polymerizing an aromatic compound having a phenylene chain with a sulfonating agent, so as to introduce a sulfonic acid group into the polymer.

However, it is difficult for the polymer electrolyte fuel cell comprising a low-priced material such as the above sulfonated rigid polyphenylene to have the same power generation efficiency as in the case of using the above perfluoroalkylene sulfonic acid polymer.

DISCLOSURE OF THE INVENTION

It is the object of the present invention to solve the above problems and to provide an inexpensive polymer electrolyte fuel cell having an excellent power generation efficiency through using a material alternative to the perfluoroalkylene sulfonic acid polymer.

To achieve the above object, the polymer electrolyte fuel cell of the present invention is characterized in that it comprises a pair of electrodes consisting of an oxygen electrode and a fuel electrode both having a catalyst layer containing a catalyst and an ion conducting material, and a polymer electrolyte membrane sandwiched between the catalyst layers of both the electrodes; wherein the above ion conducting material comprised in the above polymer electrolyte membrane or in the catalyst layer of at least one of the above electrodes comprises a sulfonated polyarylene having sulfonic acid side-chain groups.

The above sulfonated polyarylene contains no fluorine in its molecular structure, or contains fluorine only as an electronic absorption group as described above, and accordingly it is low-priced. Thus, the polymer electrolyte fuel cell of the present invention enables cost reduction through using the above sulfonated polyarylene, thereby obtaining inexpensive polymer electrolyte fuel cells.

An example of the above sulfonated polyarylene may include a copolymer consisting of 30 to 95 mol % of an aromatic compound unit represented by the following formula (1) and 70 to 5 mol % of an aromatic compound unit represented by the following formula (2) and having sulfonic acid side-chain groups:

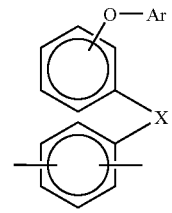  (1)

wherein Ar represents an aryl group, and X represents one type of divalent electron-attracting group selected from a group consisting of —CO—, —CONH—, —(CF$_2$)$_p$— (wherein p is an integer of 1 to 10), —C(CF$_3$)—, —COO—, —SO— and

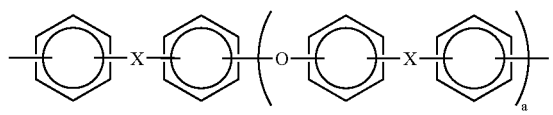  (2)

wherein X has the same meaning as that in formula (1), each of X may be identical or different, and a is an integer of 0 to 3.

Herein, the sulfonic acid group is not introduced into an aromatic ring next to the electronic absorption group, but it is only introduced into an aromatic ring that is not next thereto. Accordingly, in the sulfonated polyarylene mentioned above, the sulfonic acid group is introduced into only an aromatic ring represented by Ar in the aromatic compound unit represented by the above formula (1). Thus, by altering the molar ratio between the aromatic compound unit represented by formula (1) and the aromatic compound unit represented by formula (2), the amount of the introduced sulfonic acid group, that is, an ion exchange capacity, can be controlled.

In the above sulfonated polyarylene, if the aromatic compound unit represented by formula (1) is less than 30 mol % and the aromatic compound unit represented by formula (2) exceeds 70 mol %, a necessary ion exchange capacity cannot be obtained. In contrast, if the aromatic compound unit represented by formula (1) exceeds 95 mol % and the aromatic compound unit represented by formula (2) is less than 5 mol %, the amount of the introduced sulfonic acid group increases, and the molecular structure thereby weakens.

By the way, when the above sulfonated polyarylene is used as the above ion conducting material constituting the above polymer electrolyte membrane or the above catalyst layer, various aspects are considered depending on purposes.

Now, the first aspect of the present invention will be explained below.

When compared with the above perfluoroalkylene sulfonic acid polymer, the above sulfonated polyarylene has a greater dynamic viscoelastic coefficient that is an index of hardness. Accordingly, if a polymer electrolyte membrane comprising the sulfonated polyarylene is intended to be laminated to a catalyst layer comprising the perfluoroalkylene sulfonic acid polymer as the ion conducting binder, a sufficient adhesiveness can hardly be obtained between the polymer electrolyte membrane and the fuel and oxygen electrodes. As a result, a problem occurs in that protons passing through the interface between the polymer electrolyte membrane and the catalyst layer are inhibited, thereby increasing resistance overvoltage.

Thus, in the first aspect, it is the object of the present invention to provide a polymer electrolyte fuel cell, which is capable of obtaining a good adhesiveness between a polymer electrolyte membrane and electrodes, when the polymer electrolyte membrane comprising the above sulfonated polyarylene is used, thereby suppressing the increase of resistance voltage.

In order to achieve the above object, in the first aspect, the polymer electrolyte fuel cell of the present invention is characterized in that: the polymer electrolyte membrane comprises a sulfonated polyarylene having a dynamic viscoelastic coefficient at 110° C. in a range of $1 \times 10^9$ to $1 \times 10^{11}$ Pa, and having sulfonic acid side-chain groups; and that the above catalyst layer comprises catalyst particles consisting of catalyst carriers and catalysts supported by the above catalyst carriers, integrated by ion conducting binders, a dynamic viscoelastic coefficient at 110° C. of which is smaller than that of the above polymer electrolyte membrane.

In the polymer electrolyte fuel cell of the present invention, there is used a polymer electrolyte membrane having a dynamic viscoelastic coefficient at 110° C. in a range of $1 \times 10^9$ to $1 \times 10^{11}$ Pa, and further, the dynamic viscoelastic coefficient at 110° C. of the ion conducting binder in the above catalyst layer is set smaller than that of the above polymer electrolyte membrane. As a result, a good adhesiveness can be obtained between the above polymer electrolyte membrane and the catalyst layers of the above electrodes. Accordingly, the increase of resistance overvoltage generated between the above polymer electrolyte membrane and the electrodes can be suppressed, thereby obtaining an excellent power generation efficiency.

A copolymer consisting of 30 to 95 mol % of the aromatic compound unit represented by the above formula (1) and 70 to 5 mol % of the aromatic compound unit represented by the above formula (2) and having sulfonic acid side-chain groups can be used as an example of the above polymer electrolyte membrane. The reason why the molar ratio between the aromatic compound unit represented by the above formula (1) and the aromatic compound unit represented by the above formula (2) is set within the above range is as described above.

A specific example of the sulfonated polyarylene comprised in the above polymer electrolyte membrane includes a sulfonated polyarylene represented by the following formula (3):

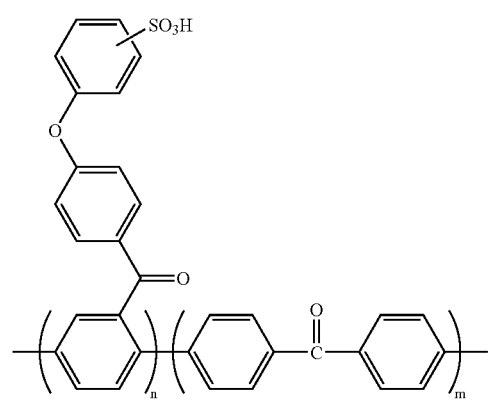

(3)

In order to obtain a good adhesiveness between the above ion conducting binder and the above polymer electrolyte membrane, the dynamic viscoelastic coefficient at 110° C. of the above ion conducting binder is preferably within a range of 1/2 to 1/1000 of that of the above polymer electrolyte membrane. If the dynamic viscoelastic coefficient at 110° C. of the above ion conducting binder is greater than 1/2 of that of the above polymer electrolyte membrane, an adhesiveness to the above polymer electrolyte membrane decreases. In contrast, if the dynamic viscoelastic coefficient at 110° C. of the above ion conducting binder is smaller than 1/1000 of that of the above polymer electrolyte membrane, the difference of the hardness between the above ion conducting binder and the above polymer electrolyte membrane becomes large, so that a good adhesiveness might not be obtained.

An example of the above ion conducting binder includes a sulfonated polyarylene consisting of 50 to 70 mol % of the aromatic compound unit represented by the above formula (1) and 50 to 30 mol % of the aromatic compound unit represented by the following formula (4) and having sulfonic acid side-chain groups:

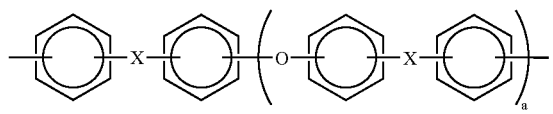

(4)

wherein X has the same meaning as that in formula (1), each of X may be identical or different, and a is an integer of 2 or greater.

In the sulfonated polyarylene used in the above ion conducting binder, the aromatic compound unit represented by the above formula (1) is the same as in the case of the above polymer electrolyte membrane, but the aromatic compound unit represented by the above formula (4) differs from the aromatic compound unit represented by the above formula (2) in that a is an integer of 2 or greater in the above formula (4). On condition that a is an integer of 2 or greater, the above sulfonated polyarylene has a long polyether chain, and it becomes softer than the above polymer electrolyte membrane.

In the above sulfonated polyarylene, if the aromatic compound unit represented by formula (1) is less than 50 mol % and the aromatic compound unit represented by formula (4) exceeds 50 mol %, an ion exchange capacity required of the above ion conducting binder might not be obtained. Moreover, if the aromatic compound unit represented by formula (1) exceeds 70 mol % and the aromatic compound unit represented by formula (4) is less than 30 mol %, as described above, the amount of the introduced sulfonic acid group increases, thereby weakening the molecular structure.

A specific example of the sulfonated polyarylene used for the above ion conducting binder includes a sulfonated polyarylene represented by the following formula (5) or the like:

Furthermore, a perfluoroalkylene sulfonic acid polymer may also be used for the above ion conducting binder.

Next, the second aspect of the present invention will be explained below.

The specification of U.S. Pat. No. 5,403,675 discloses the use of sulfonated rigid polyphenylene as a polymer electrolyte membrane. However, a sulfonated polyarylene such as the above sulfonated rigid polyphenylene is considered to be used not only as the above polymer electrolyte membrane, but also as an ion conducting binder in the above catalyst layer. By using the above sulfonated polyarylene as the above ion conducting binder, it is expected that cost would be further reduced.

The present inventors have variously studied the use of a sulfonated polyarylene as an ion conducting material contained in the catalyst layer. As a result, they have found that a sulfonated polyarylene such as the sulfonated rigid polyphenylene described in the above U.S. Pat. No. 5,403,675 has an excellent ability to coat the above catalyst particle.

When the sulfonated rigid polyphenylene described in the above specification is used as an ion conducting binder forming the catalyst layer of a polymer electrolyte fuel cell, it is expected that the three-phase interface of the fuel cell

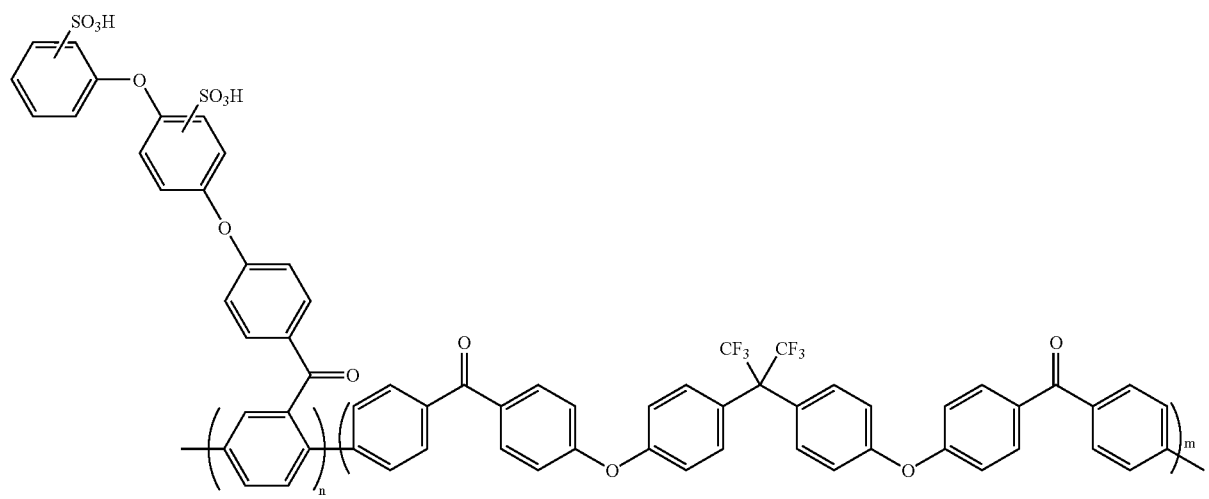

Moreover, instead of the above sulfonated polyarylene, a polyether ether ketone represented by the following formula (6) or (7) may be used for the above ion conducting binder:

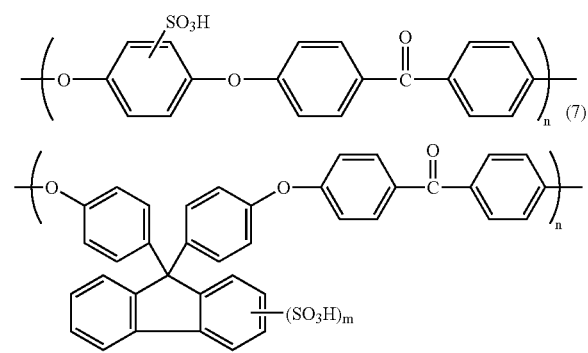

increases and the amount of generated electric power thereby increases. It should be noted that the above three-phase interface is used to mean an interface among fuel or oxidizing gas, the above catalyst particle, and the above ion conducting binder in the above catalyst layer.

However, according to the studies by the present inventors, although the sulfonated rigid polyphenylene described in the above specification is used as the above ion conducting binder, the amount of generated electric power does not increase as expected. Actually, the amount of generated electric power was smaller than that of a polymer electrolyte fuel cell in which the above perfluoroalkylene sulfonic acid polymer was used as the above ion conducting binder. This may be because the sulfonated rigid polyphenylene described in the above specification has an excessive ability to coat the above catalyst particle and the above three-phase interface conversely decreases.

Thus, in the second aspect of the present invention, it is the object of the present invention to provide a polymer electrolyte fuel cell, which increases the above three-phase interface and has excellent performance of generating electric power when using a sulfonated polyarylene as an ion conducting binder.

In order to achieve the above object, in the second aspect of the present invention, the polymer electrolyte fuel cell is characterized in that: the above catalyst layer comprises catalyst particles consisting of catalyst carriers and catalysts supported by the catalyst carriers that are formed by unifying by ion conducting binders; and that the above ion conducting binder comprises a sulfonated polyarylene that is a copolymer consisting of 30 to 95 mol % of the aromatic compound unit represented by the above formula (1) and 70 to 5 mol % of the aromatic compound unit represented by the above formula (2) and having sulfonic acid side-chain groups.

In the polymer electrolyte fuel cell in the present aspect, the above copolymer has a molecular structure such that a polymer consists of a phenylene chain obtained by polymerizing only the aromatic compound unit represented by the above formula (1), wherein the phenylene chain is divided by the aromatic compound unit represented by the above formula (2). The above copolymer moderately coats the surface of the above catalyst particle, thereby increasing the above three-phase interface in the above catalyst layer. Thus, the polymer electrolyte fuel cell in the present aspect enables the increase of the amount of generated electric power, and it exerts the same power generation efficiency as a polymer electrolyte fuel cell, which uses a perfluoroalkylene sulfonic acid polymer. In the above sulfonated polyarylene, the reason why the molar ratio between the aromatic compound unit represented by the above formula (1) and the aromatic compound unit represented by the above formula (2) is set within the above range is as described above.

In order to show an ion conductivity, the above sulfonated polyarylene is required to contain water. The above ion conducting binder preferably contains 15 to 40% by weight of water under the environment of a temperature of 80° C. and a relative humidity of 90%. If the binder contains less than 15% by weight of water, it cannot obtain an ion conductivity, but if the binder contains more than 40% by weight of water, fuel or oxidizing gas is hardly diffused in the above catalyst layer.

Moreover, the above ion conducting binder preferably has an ion exchange capacity of 1.9 to 2.4 meq/g. If the ion exchange capacity is less than 1.9 meq/g, a sufficient power generation efficiency may not be obtained, but if it is more than 2.4 meq/g, the amount of sulfonic acid groups increases in the above sulfonated polyarylene, thereby weakening the molecular structure.

Furthermore, in order to increase the above three-phase interface in the above catalyst layer, the above ion conducting binder preferably coats 80 m$^2$/g or larger of the surface area of a catalyst supported by the above catalyst carrier. When the surface area of the above catalyst coated by the above ion conducting binder is smaller than 80 m$^2$/g, a sufficient power generation efficiency may not be obtained.

In the above polymer electrolyte fuel cell, in order to improve its power generation efficiency, it is desired that the above electrodes are highly adhesive to the above polymer electrolyte membrane. Thus, in the present aspect, the polymer electrolyte fuel cell is characterized in that the above polymer electrolyte membrane comprises a sulfonated polyarylene that is a copolymer consisting of 30 to 95 mol % of the aromatic compound unit represented by the formula (1) and 70 to 5 mol % of the aromatic compound unit represented by the formula (2) and having sulfonic acid side-chain groups.

Consequently, both the ion conducting binder constituting the above catalyst layer and the above polymer electrolyte membrane are comprised of the same type of resin, so that an excellent adhesiveness can be obtained between the above electrodes and the above polymer electrolyte membrane. The reason why the molar ratio between the aromatic compound unit represented by the above formula (1) and the aromatic compound unit represented by the above formula (2) is set within the above range is as described above.

In the present aspect, the sulfonated polyarylene represented by the above formula (3) or the like can be specifically used as the above ion conducting binder or the above polymer electrolyte membrane.

Since the above ion conducting binder is used to coat the above catalyst particle as described above, if the specific surface are of a catalyst carrier is small, fuel or oxidizing gas is hardly diffused in the above catalyst layer. Thus, in order that fuel or oxidizing gas is easily diffused in the above catalyst layer, the above catalyst carrier is preferably carbon black having a specific surface area of 800 m$^2$/g or larger.

Next, the third aspect of the present invention will be explained below.

As stated above, since the above sulfonated polyarylene has an excellent ability to coat catalyst particle, it is expected that the use of the polymer as an ion conducting binder forming the above catalyst layer increases the above three-phase interface, thereby increasing the amount of generated electric power.

However, the above sulfonated polyarylene has a linear molecular structure. If such polymers are aligned in the same length and direction, a space is not easily generated between adjacent molecules. Accordingly, when the above catalyst particle is coated by the sulfonated polyarylene, the pores of a catalyst carrier that is a porous form are likely to be blocked. If the pores of the above catalyst carrier are blocked, the diffusibility of the above fuel or oxidizing gas decreases, and a sufficient power generation efficiency may not be obtained although the above three-phase interface increases.

Hence, in the third aspect of the present invention, it is the object of the present invention to provide a polymer electrolyte fuel cell, which does not easily block the pores of the above catalyst carrier when a sulfonated polyarylene is used as an ion conducting binder, and exerts an excellent power generation efficiency.

In order to achieve the above object, in the third aspect of the present invention, the polymer electrolyte fuel cell is characterized in that: the above catalyst layer comprises catalyst particles consisting of catalyst carriers and catalysts supported by the catalyst carriers that are formed by unifying by ion conducting binders; and that the above ion conducting binder comprises a sulfonated polyarylene that is a copolymer consisting of 30 to 95 mol % of the aromatic compound unit represented by the above formula (1) and 70 to 5 mol % of the aromatic compound unit represented by the above formula (4) and having sulfonic acid side-chain groups, wherein the above catalyst carrier is a porous form that is made of pores that are 100 nm or shorter in diameter, having a pore volume of 1.0 to 1.5 ml/g.

The above sulfonated polyarylene has a long polyether chain because a is an integer of 2 or greater in the aromatic compound unit represented by the above formula (4). In an ether bond, a bond angle having oxygen in the center is smaller than 180°. Accordingly, as a polyether chain becomes long, and the number of the ether bonds increases, the molecule has a zigzag structure. As a result, although the above sulfonated polyarylene is aligned in the same length and direction, a space is generated between adjacent molecules. Accordingly, when the above catalyst particle is coated by the sulfonated polyarylene, the pores of a catalyst carrier that is a porous form are hardly blocked.

Herein, since the above catalyst carrier is a porous form that is made of pores that are 100 nm or shorter in diameter, having a pore volume of 1.0 to 1.5 ml/g, as described above, and since the sulfonated polyarylen has a zigzag molecular structure, and a long polyether chain, the above pores are hardly blocked, and a good gas diffusibility can be obtained.

If the pore volume of the above porous form is less than 1.0 ml/g in the above catalyst carrier, pores blocked by the above sulfonated polyarylene increase, and a sufficient gas diffusibility cannot be obtained. If the pore volume of the above porous form exceeds 1.5 ml/g, a sufficient three-phase interface cannot be maintained among the above fuel or oxidizing gas, the above catalyst particle, and the above ion conducting binder.

The polymer electrolyte fuel cell of the present invention having the above described configuration enables the increase of the above three-phase interface and a sufficient gas diffusibility in the catalyst layer, thereby exerting an excellent power generation efficiency.

In the above sulfonated polyarylene, the above sulfonic acid group is introduced into only the aromatic ring represented by Ar in the aromatic compound unit represented by the above formula (1). Thus, by altering the molar ratio between the aromatic compound unit represented by the above formula (1) and the aromatic compound unit represented by the above formula (4), the amount of the introduced sulfonic acid group, that is, an ion exchange capacity, can be controlled.

In the above sulfonated polyarylene, if the aromatic compound unit represented by the above formula (1) is less than 30 mol % and the aromatic compound unit represented by the above formula (4) exceeds 70 mol %, an ion exchange capacity, which is necessary as an ion conducting binder, cannot be obtained. In contrast, if the aromatic compound unit represented by the above formula (1) exceeds 95 mol % and the aromatic compound unit represented by the above formula (4) is less than 5 mol %, the amount of the introduced sulfonic acid group increases, and the molecular structure thereby weakens.

The above sulfonated polyarylene with the above described configuration preferably has an ion exchange capacity of 1.7 to 2.2 meq/g. The sulfonated polyarylene represented by the above formula (5) or the like can be used as a specific example of the above ion conducting binder.

At the same time, in the above polymer electrolyte fuel cell, in order to improve its power generation efficiency, it is desired that the above electrodes are highly adhesive to the above polymer electrolyte membrane. Thus, in the present aspect, the polymer electrolyte fuel cell is characterized in that the above polymer electrolyte membrane comprises a sulfonated polyarylene that is a copolymer consisting of 30 to 95 mol % of the aromatic compound unit represented by the above formula (1) and 70 to 5 mol % of the aromatic compound unit represented by the above formula (2) and having sulfonic acid side-chain groups.

Consequently, both the ion conducting binder constituting the above catalyst layer and the above polymer electrolyte membrane are comprised of the same type of resin, so that an excellent adhesiveness can be obtained between the above electrodes and the above polymer electrolyte membrane. The reason why the molar ratio between the aromatic compound unit represented by the above formula (1) and the aromatic compound unit represented by the above formula (2) is set within the above range is as described above.

The sulfonated polyarylene represented by the above formula (3) can be used as an example of the above polymer electrolyte membrane.

Next, the fourth aspect of the present invention will be explained below.

The polymer electrolyte fuel cell, which uses the above sulfonated polyarylene as an ion conducting binder for a pair of electrodes consisting of the above fuel electrode and oxygen electrode, may significantly decrease its power generation efficiency, when the current density increases.

Thus, in the fourth aspect of the present invention, it is the object of the present invention to provide a polymer electrolyte fuel cell, which exerts an excellent power generation efficiency even in the high current density region.

The present inventors have made intensive studies to know the reason why the polymer electrolyte fuel cell using the above sulfonated polyarylene as the above ion conducting binder significantly decreases its power generation efficiency, when the current density increases. As a result, they have obtained the following findings:

The above sulfonated polyarylene needs to contain a certain amount of water to show a good ion conductivity. The above sulfonated polyarylene itself has an excellent water retention.

At the same time, in the above polymer electrolyte fuel cell, as described above, a proton ($H^+$) generated from reducing gas such as hydrogen or methanol, which is supplied to the above fuel electrode, transfers to the above oxygen electrode side, so as to react with oxidizing gas such as air or oxygen to generate water, thereby generating electric power. During this process, the above proton transfers from the above fuel electrode to the above oxygen electrode, not as a single $H^+$, but as a hydrated ion such as $H_3O^+$.

As a result, since the above proton carries water away from the above fuel electrode, water decreases in the fuel electrode side. In contrast, in the above oxygen electrode, since the above proton does not only react with oxidizing gas to generate water, but it also carries water therein as a hydrated ion, the oxygen electrode is likely to be rich in water. However, as described above, the above sulfonated polyarylene has an excellent water retention, the above water remains in the oxygen electrode and is hardly drained.

This phenomenon is enhanced, as the current density increases. Thus, it is considered that, in the high current density region, gas is prevented from diffusing in the catalyst layer due to water retained by the above sulfonated polyarylene in the above oxygen electrode, and that the power generation efficiency thereby decreases.

The fourth aspect of the present invention is made based on the above findings. In order to achieve the above object, the polymer electrolyte fuel cell of the fourth aspect of the present invention is characterized in that: the above catalyst layer comprises catalyst particles consisting of catalyst carriers and catalysts supported by the catalyst carriers that are formed by unifying by ion conducting binders; an ion conducting binder forming the catalyst layer of the above oxygen electrode comprises a perfluoroalkylene sulfonic acid polymer; and an ion conducting binder forming the catalyst layer of the above fuel electrode comprises a sulfonated polyarylene that is a copolymer consisting of 30 to 95 mol % of the aromatic compound unit represented by the above formula (1) and 70 to 5 mol % of the aromatic compound unit represented by the above formula (2) and having sulfonic acid side-chain groups.

In the polymer electrolyte fuel cell of the present invention, the ion conducting binder forming the catalyst layer of the above fuel electrode is the above sulfonated polyarylene, and the ion conducting binder forming the catalyst layer of the above oxygen electrode is a perfluoroalkylene sulfonic acid polymer. Herein, the above perfluoroalkylene sulfonic acid polymer does not need to contain much water to show ion conductivity, and it has a lower water retention than the above sulfonated polyarylene.

This is to say, in the polymer electrolyte fuel cell of the present invention, the ion conducting binder in the above oxygen electrode side is a perfluoroalkylene sulfonic acid polymer having a low water retention. Accordingly, even though the proton generated in the above fuel electrode carries water away from the fuel electrode side to the above oxygen electrode side in the high current density region, the above water is smoothly drained, and an excellent power generation efficiency can be obtained without preventing gas diffusibility in the above catalyst layer.

The above sulfonated polyarylene has a molecular structure such that a polymer consists of a phenylene chain obtained by polymerizing only the aromatic compound unit represented by the above formula (1), wherein the phenylene chain is divided by the aromatic compound unit represented by the above formula (2). Accordingly it moderately coats the surface of the above catalyst particle, thereby increasing the above three-phase interface in the above catalyst layer and further increasing the amount of generated electric power. In the above sulfonated polyarylene, the reason why the molar ratio between the aromatic compound unit represented by the above formula (1) and the aromatic compound unit represented by the above formula (2) is set within the above range is as described above.

In the polymer electrolyte fuel cell in the present aspect, the sulfonated polyarylene used as the above ion conducting binder forming the catalyst layer of the above fuel electrode preferably has an ion exchange capacity of 1.9 to 2.4 meq/g. If the ion exchange capacity is less than 1.9 meq/g, the above ion conducting binder may not have a necessary ion conductivity. If it exceeds 2.4 meq/g, as described above, the amount of sulfonic acid groups increases, and the mechanical strength thereby decreases.

Moreover, in the polymer electrolyte fuel cell in the present aspect, the perfluoroalkylene sulfonic acid polymer used as the above ion conducting binder forming the catalyst layer of the above oxygen electrode preferably has an ion exchange capacity of 0.8 to 1.0 meq/g. If the ion exchange capacity is less than 0.8 meq/g, the above ion conducting binder may not have a necessary ion conductivity. If it exceeds 1.0 meq/g, as in the case of the above sulfonated polyarylene, the amount of sulfonic acid groups increases, and the mechanical strength thereby decreases.

Furthermore, in the polymer electrolyte fuel cell in the present aspect, in order to further reduce cost, the above polymer electrolyte membrane preferably comprises a sulfonated polyarylene that is a copolymer consisting of 30 to 95 mol % of the aromatic compound unit represented by the above formula (1) and 70 to 5 mol % of the aromatic compound unit represented by the above formula (2) and having sulfonic acid side-chain groups. The reason why the molar ratio between the aromatic compound unit represented by the above formula (1) and the aromatic compound unit represented by the above formula (2) is set within the above range is as described above.

In the present aspect, the sulfonated polyarylene represented by the above formula (5) or the like can be specifically used as an ion conducting binder forming the catalyst layer of the above fuel electrode or the above polymer electrolyte membrane.

Next, the fifth aspect of the present invention will be explained below.

The polymer electrolyte fuel cell, which uses the above sulfonated polyarylene as an ion conducting binder for a pair of electrodes consisting of the above fuel electrode and oxygen electrode, may significantly decrease its power generation efficiency over time, when it is used under the environment of a comparatively low relative humidity of 35 to 65%.

Thus, in the fifth aspect of the present invention, it is the object of the present invention to provide a polymer electrolyte fuel cell, which exerts an excellent power generation efficiency even in the environment where a relative humidity is comparatively low.

The present inventors have made intensive studies to know the reason why the polymer electrolyte fuel cell using the above sulfonated polyarylene as the above ion conducting binder significantly decreases its power generation efficiency under the environment where a relative humidity is comparatively low. As a result, they have obtained the following findings:

The above sulfonated polyarylene needs to contain a certain amount of water to show a good ion conductivity. The ion conductivity is humidity-dependent.

At the same time, in the above polymer electrolyte fuel cell, as described above, a proton ($H^+$) generated from reducing gas such as hydrogen or methanol, which is supplied to the above fuel electrode, transfers to the above oxygen electrode side, so as to react with oxidizing gas such as air or oxygen to generate water, thereby generating electric power. During this process, the above proton transfers from the above fuel electrode to the above oxygen electrode, not as a single $H^+$, but as a hydrated ion such as $H_3O^+$.

As a result, in the above oxygen electrode, since the above proton does not only react with oxidizing gas to generate water, but it also carries water therein as a hydrated ion, the electrode is likely to be comparatively rich in water. In contrast, in the above fuel electrode side, since the above proton carries water away therefrom, it is likely that water decreases. Thus, it is considered that, under the environment where a relative humidity is comparatively low, the ion conductivity of the above sulfonated polyarylene is likely to decrease in the above fuel electrode side, thereby decreasing the power generation efficiency.

The fifth aspect of the present invention is made based on the above findings. In order to achieve the above object, the polymer electrolyte fuel cell of the fifth aspect of the present invention is characterized in that: the above catalyst layer comprises catalyst particles consisting of catalyst carriers and catalysts supported by the catalyst carriers that are formed by unifying by ion conducting binders; an ion conducting binder forming the catalyst layer of the above oxygen electrode comprises a sulfonated polyarylene that is a copolymer consisting of 30 to 95 mol % of the aromatic compound unit represented by the above formula (1) and 70 to 5 mol % of the aromatic compound unit represented by the above formula (2) and having sulfonic acid side-chain groups; and an ion conducting binder forming the catalyst layer of the above fuel electrode comprises a perfluoroalkylene sulfonic acid polymer.

In the polymer electrolyte fuel cell in the present aspect, the ion conducting binder forming the catalyst layer of the above oxygen electrode is the above sulfonated polyarylene, and the ion conducting binder forming the catalyst layer of the above fuel electrode is a perfluoroalkylene sulfonic acid polymer. Herein, the above perfluoroalkylene sulfonic acid polymer does not need to contain much water to show ion conductivity, and its ion conductivity is less humidity-dependent than that of the above sulfonated polyarylene.

Accordingly, in the polymer electrolyte fuel cell in the present aspect, even though the proton generated in the above fuel electrode carries water away from the fuel electrode side to the above oxygen electrode side in a state where a relative humidity is comparatively low, the ion conductivity of the ion conducting binder in the fuel electrode side hardly decreases, and an excellent power generation efficiency can be obtained.

The above sulfonated polyarylene has a molecular structure such that a polymer consists of a phenylene chain obtained by polymerizing only the aromatic compound unit represented by the above formula (1), wherein the phenylene chain is divided by the aromatic compound unit represented by the above formula (2). Accordingly it moderately coats the surface of the above catalyst particle, thereby increasing the above three-phase interface and further increasing the amount of generated electric power. The reason why the molar ratio between the aromatic compound unit represented by the above formula (1) and the aromatic compound unit represented by the above formula (2) is set within the above range is as described above.

In the polymer electrolyte fuel cell in the present aspect, the sulfonated polyarylene used as the above ion conducting binder forming the catalyst layer of the above oxygen electrode preferably has an ion exchange capacity of 1.9 to 2.4 meq/g. If the ion exchange capacity is less than 1.9 meq/g, the above ion conducting binder may not have a necessary ion conductivity. If it exceeds 2.4 meq/g, as described above, the amount of sulfonic acid groups increases, and the mechanical strength thereby decreases.

Moreover, in the polymer electrolyte fuel cell in the present aspect, the perfluoroalkylene sulfonic acid polymer used as the above ion conducting binder forming the catalyst layer of the above fuel electrode preferably has an ion exchange capacity of 0.8 to 1.0 meq/g. If the ion exchange capacity is less than 0.8 meq/g, the above ion conducting binder may not have a necessary ion conductivity. If it exceeds 1.0 meq/g, as in the case of the above sulfonated polyarylene, the amount of sulfonic acid groups increases, and the mechanical strength thereby decreases.

Furthermore, in the polymer electrolyte fuel cell in the present aspect, in order to further reduce cost, the above polymer electrolyte membrane preferably comprises a sulfonated polyarylene that is a copolymer consisting of 30 to 95 mol % of the aromatic compound unit represented by the above formula (1) and 70 to 5 mol % of the aromatic compound unit represented by the above formula (2) and having sulfonic acid side-chain groups. The reason why the molar ratio between the aromatic compound unit represented by the above formula (1) and the aromatic compound unit represented by the above formula (2) is set within the above range is as described above.

In the present aspect, the sulfonated polyarylene represented by the above formula (5) or the like can be specifically used as the above ion conducting binder forming the catalyst layer of the above fuel electrode or the above polymer electrolyte membrane.

Next, the sixth aspect of the present invention will be explained below.

In the sixth aspect of the present invention, it is the object of the present invention to provide a polymer electrolyte fuel cell, in which catalysts forming a catalyst layer have a large effective area per unit weight, thereby exerting an excellent power generation efficiency.

In the sixth aspect of the present invention, in order to achieve the above object, the polymer electrolyte fuel cell is characterized in that the above catalyst layer comprises: an ion conducting material comprising a sulfonated polyarylene having sulfonic acid side-chain groups; and a catalyst generated by subjecting the hydrogen ion of the above sulfonic acid group of the above sulfonated polyarylene copolymer to ion exchange with a catalyst ion and then reducing the above catalyst ion, and supported by the above ion conducting material.

In the polymer electrolyte fuel cell in the present aspect, since the catalyst is generated by reduction of the ion as described above, it can be made much smaller than in the case of making a carrier particle to support a powdery catalyst, and the effective surface area per unit weight of the catalyst thereby becomes significantly large. Thus, in the polymer electrolyte fuel cell of the present invention, fuel or oxidizing gas easily comes into contact with the above catalyst in the above catalyst layer, and the power generation efficiency can be thereby improved. Moreover, since the amount of the catalyst can be reduced, the production cost can be further reduced.

The above described ion exchange can be carried out by, for example, immersing the above ion conducting material into a solution comprising a noble metal complex used as a catalyst and at least one type of additive selected from a group consisting of an aqueous organic solvent, a nonionic surfactant and a non-metallic base.

In the polymer electrolyte fuel cell in the present aspect, the above ion conducting material comprises, for example, a sulfonated polyarylene that is a copolymer consisting of 30 to 95 mol % of the aromatic compound unit represented by the above formula (1) and 70 to 5 mol % of the aromatic compound unit represented by the above formula (2) and having sulfonic acid side-chain groups. The reason why the molar ratio between the aromatic compound unit represented by the above formula (1) and the aromatic compound unit represented by the above formula (2) is set within the above range is as described above.

Moreover, in the polymer electrolyte fuel cell in the present aspect, in order to further improve the power generation efficiency, it is desired that the above electrodes are highly adhesive to the above polymer electrolyte membrane. Thus, the polymer electrolyte fuel cell of the present invention is characterized in that the above polymer electrolyte membrane comprises a sulfonated polyarylene that is a copolymer consisting of 30 to 95 mol % of the aromatic compound unit represented by the above formula (1) and 70 to 5 mol % of the aromatic compound unit represented by the above formula (2) and having sulfonic acid side-chain groups.

As a consequence, both the ion conducting binder constituting the above catalyst layer and the above polymer electrolyte membrane are comprised of the same type of resin, so that an excellent adhesiveness can be obtained between the above electrodes and the above polymer electrolyte membrane. The reason why the molar ratio between the aromatic compound unit represented by the above formula (1) and the aromatic compound unit represented by the above formula (2) is set within the above range is as described above.

In the present aspect, the sulfonated polyarylene represented by the above formula (5) or the like can be specifically used as the above ion conducting binder forming the catalyst layer of the above fuel electrode or the above polymer electrolyte membrane.

BRIEF DESCRIPTION OF THE DRAWINGS

FIG. 12 is a graph showing the power generation efficiency of a polymer electrolyte fuel cell in the sixth aspect of the present invention.

BEST MODE FOR CARRYING OUT THE INVENTION

Next, the first embodiment of the present invention will be explained below.

Figure 1:
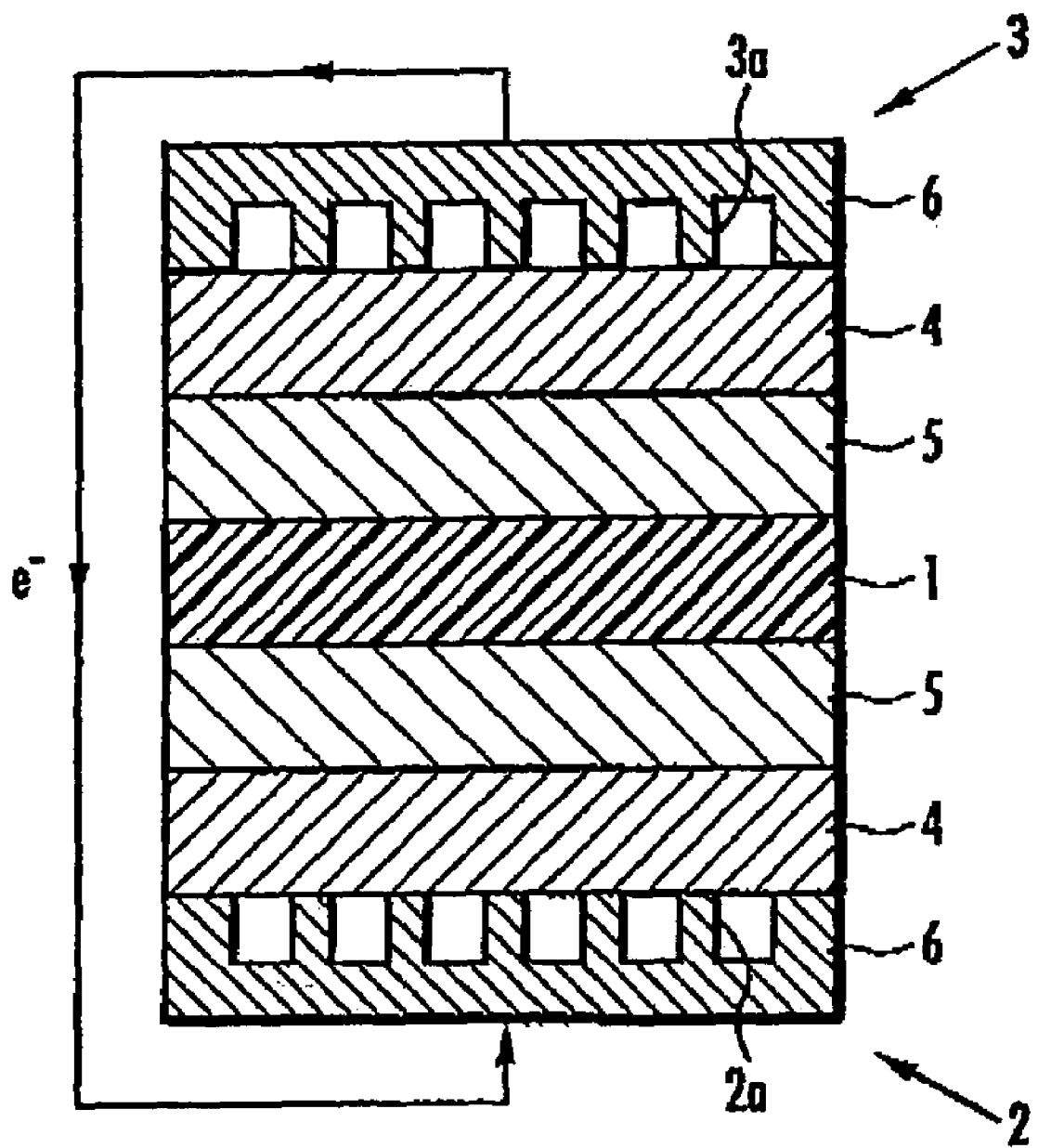
FIG. 1 is an illustrative sectional view of the polymer electrolyte fuel cell of the present invention.

As shown in FIG. 1, the polymer electrolyte fuel cell of the present embodiment comprises a polymer electrolyte membrane 1 and a pair of electrodes consisting of an oxygen electrode 2 and a fuel electrode 3. Each of the oxygen electrode 2 and the fuel electrode 3 comprises a backing layer 4 and a catalyst layer 5 formed on the backing layer 4. The polymer electrolyte membrane 1 is sandwiched between the catalyst layers 5, 5 of the oxygen electrode 2 and the fuel electrode 3.

Each backing layer 4 comprises a separator 6, which is adhered to an exterior side thereof. In the oxygen electrode 2, the separator 6 comprises an oxygen passage 2a, through which oxygen-containing gas such as air flows, on the backing layer 4 side. In the fuel electrode 3, the separator 6 comprises a fuel passage 3a, through which fuel gas such as hydrogen flows, on the backing layer 4 side.

In the present embodiment, as the polymer electrolyte membrane 1 of the above polymer electrolyte fuel cell, there is used a sulfonated polyarylene obtained by reacting a polyarylene polymer consisting of 30 to 95 mol % of an aromatic compound unit represented by the following formula (1) and 70 to 5 mol % of an aromatic compound unit represented by the following formula (2) with concentrated sulfuric acid for sulfonation, so that a sulfonic acid group is introduced in a side chain thereof. The above sulfonated polyarylene has a dynamic viscoelastic coefficient at 110° C. in a range of $1\times10^9$ to $1\times10^{11}$ Pa:

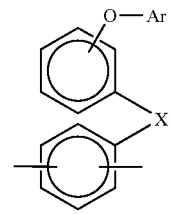

(1)

wherein Ar represents an aryl group, and X represents one type of divalent electron-attracting group selected from a group consisting of —CO—, —CONH—, —(CF$_2$)$_p$— (wherein p is an integer of 1 to 10), —C(CF$_3$)—, —COO—, —SO— and —SO$_2$—; and

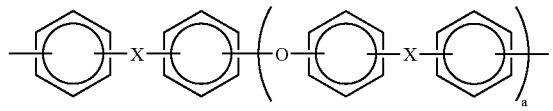

(2)

wherein X has the same meaning as that in formula (1), each of X may be identical or different, and a is an integer of 0 to 3.

An example of a monomer corresponding to the above formula (1) includes 2,5-dichloro-4'-phenoxybenzophenone. Examples of a monomer corresponding to the above formula (2) include 4,4'-dichlorobenzophenone and 4,4'-bis(4-chlorobenzoyl)diphenyl ether.

The polymer electrolyte membrane 1 is a dry film having a desired thickness, which is produced by dissolving the above sulfonated polyarylene in a solvent such as N-methylpyrrolidone, and then performing the cast method on the thus obtained product.

In the above polymer electrolyte fuel cell, the backing layer 4 of each of the oxygen electrode 2 and the fuel electrode 3 consists of a carbon paper and a primary layer. The backing layer 4 is formed by, for example, mixing carbon black and polytetrafluoroethylene (PTFE) at a certain weight ratio, uniformly dispersing the obtained mixture in an organic solvent such as ethylene glycol so as to obtain a slurry, and applying the slurry on the one side of the above carbon paper followed by drying to obtain the above primary layer.

The catalyst layer 5 is formed by uniformly mixing a catalyst particle and an ion conducting binder at a certain weight ratio so as to obtain a catalyst paste, and subjecting the paste to screen printing, so as to obtain an established amount of platinum on a primary layer 7, followed by drying. The above catalyst particle consists of, for example, platinum supported by carbon black (furnace black) at a certain weight ratio. The above drying is carried out, for example, by drying at 60° C. for 10 minutes and then vacuum drying at 120° C.

An example of the above ion conducting binder includes a sulfonated polyarylene obtained by reacting a polyarylene polymer consisting of 50 to 70 mol % of the aromatic compound unit represented by the above formula (1) and 50 to 30 mol % of an aromatic compound unit represented by the following formula (4) with concentrated sulfuric acid for sulfonation, so as to introduce sulfonic acid side-chain groups, followed by dissolving it in a solvent such as N-methylpyrrolidone:

(4)

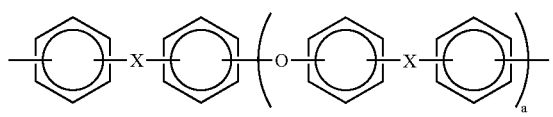

wherein X has the same meaning as that in formula (1), each of X may be identical or different, and a is an integer of 2 or greater.

Otherwise, a product obtained by dissolving a perfluoroalkylene sulfonic acid polymer (e.g., Nafion (product name) by DuPont) in a solvent such as N-methylpyrrolidone can also be used as the above ion conducting binder.

The dynamic viscoelastic coefficient at 110° C. of the above ion conducting binder is within a range of 1/2 to 1/1000 of the above polymer electrolyte membrane.

The above polymer electrolyte fuel cell is formed by hot pressing the polymer electrolyte membrane 1, which is sandwiched by the catalyst layers 5, 5 of the oxygen electrode 2 and the fuel electrode 3. The hot pressing can be carried out by, for example, performing the first pressing at 80° C. at 5 MPa for 2 minutes and then the second pressing at 160° C. at 4 MPa for 1 minute.

Next, the second embodiment of the present invention will be explained below.

In the polymer electrolyte fuel cell of the present embodiment as shown in FIG. 1, the ion conducting binder forming the catalyst layer 5 is a sulfonated polyarylene obtained by reacting a polyarylene polymer consisting of 30 to 95 mol % of the aromatic compound unit represented by the above formula (1) and 70 to 5 mol % of the aromatic compound unit represented by the above formula (2) with concentrated sulfuric acid for sulfonation, so that a sulfonic acid group is introduced in a side chain thereof. The above sulfonated polyarylene is used as the above ion conducting binder by dissolving it in a solvent such as N-methylpyrrolidone.

Moreover, in the present embodiment, platinum supported by carbon black (furnace black) having a specific surface area of 800 m²/g or larger at a certain weight ratio is used as a catalyst particle that forms the catalyst layer 5.

The constitutions of the polymer electrolyte fuel cell of the present embodiment other than the constitution of the above catalyst layer 5 are completely identical to the polymer electrolyte fuel cell of the first embodiment. Accordingly, the polymer electrolyte fuel cell of the present embodiment can be formed in the same manner as in the first embodiment.

The sulfonated polyarylene, which forms the above ion conducting binder, has an ion exchange capacity of 1.9 to 2.4 meq/g and contains 15 to 40% by weight of water under the environment of 80° C. and a relative humidity of 90%.

The above ion conducting binder can coat 80 m²/g or larger of the surface area of the platinum supported by the above carbon black.

Next, the third embodiment of the present invention will be explained below.

In the polymer electrolyte fuel cell of the present embodiment as shown in FIG. 1, the ion conducting binder forming the catalyst layer 5 is a sulfonated polyarylene that is a copolymer consisting of 30 to 95 mol % of the aromatic compound unit represented by the above formula (1) and 70 to 5 mol % of the aromatic compound unit represented by the above formula (4) and having sulfonic acid side-chain groups. The above sulfonated polyarylene is used as the above ion conducting binder by dissolving it in a solvent such as N-methylpyrrolidone.

In the present embodiment, the above catalyst particle is platinum supported by carbon black (furnace black) at a certain weight ratio, and the carbon black is make of pores that are 800 m²/g or larger in specific surface area and 100 nm or shorter in diameter, having a pore volume of 1.0 to 1.5 ml/g.

The constitutions of the polymer electrolyte fuel cell of the present embodiment other than the constitution of the above catalyst layer 5 are completely identical to the polymer electrolyte fuel cell of the first embodiment. Accordingly, the polymer electrolyte fuel cell of the present embodiment can be formed in the same manner as in the first embodiment.

The sulfonated polyarylene, which forms the above ion conducting binder, has an ion exchange capacity of 1.7 to 2.2 meq/g. Moreover, in the above sulfonated polyarylene, since a is an integer of 2 or greater in the above formula (4), the polyether chain becomes long and the molecule has a zigzag structure.

Accordingly, the above ion conducting binder can coat 80 m²/g or larger of the surface area of the platinum supported by the above carbon black. Moreover, the above ion conducting binder hardly blocks the pores of the above carbon black, thereby obtaining a sufficient gas diffusibility.

Next, the fourth embodiment of the present invention will be explained below.

In the polymer electrolyte fuel cell of the present embodiment as shown in FIG. 1, the ion conducting binder forming the catalyst layer 5 of the oxygen electrode 2 is a perfluoroalkylene sulfonic acid polymer or the like, which is dissolved in a solvent such as isopropanol or n-propanol. On the other hand, the ion conducting binder forming the catalyst layer 5 of the fuel electrode 3 is a sulfonated polyarylene, which is dissolved in a solvent such as N-methylpyrrolidone.

The constitutions of the polymer electrolyte fuel cell of the present embodiment other than the constitution regarding the catalyst layers 5, 5 of the above oxygen electrode 2 and fuel electrode 3 are completely identical to the polymer electrolyte fuel cell of the first embodiment. Accordingly, the polymer electrolyte fuel cell of the present embodiment can be formed in the same manner as in the first embodiment.

The sulfonated polyarylene, which forms the ion conducting binder forming the catalyst layer 5 of the fuel electrode 3, is obtained by reacting a polyarylene polymer consisting of 30 to 95 mol % of the aromatic compound unit represented by the above formula (1) and 70 to 5 mol % of the aromatic compound unit represented by the above formula (2) with concentrated sulfuric acid for sulfonation, so as to introduce sulfonic acid side-chain groups. Moreover, monomers corresponding to the above formulas (1) and (2) are the same as in the case of the polymer electrolyte membrane 1 in the first embodiment.

Next, the fifth embodiment of the present invention will be explained below.

In the polymer electrolyte fuel cell of the present embodiment as shown in FIG. 1, the ion conducting binder forming the catalyst layer 5 of the oxygen electrode 2 is a sulfonated polyarylene, which is dissolved in a solvent such as N-methylpyrrolidone. On the other hand, the ion conducting binder forming the catalyst layer 5 of the fuel electrode 3 is a perfluoroalkylene sulfonic acid polymer or the like, which is dissolved in a solvent such as isopropanol or n-propanol.

The constitutions of the polymer electrolyte fuel cell of the present embodiment other than the constitution regarding the catalyst layers 5, 5 of the above oxygen electrode 2 and fuel electrode 3 are completely identical to the polymer electrolyte fuel cell of the first embodiment. Accordingly, the polymer electrolyte fuel cell of the present embodiment can be formed in the same manner as in the first embodiment.

The sulfonated polyarylene, which forms the ion conducting binder forming the catalyst layer 5 of the oxygen electrode 2, is obtained by reacting a polyarylene polymer consisting of 30 to 95 mol % of the aromatic compound unit represented by the above formula (1) and 70 to 5 mol % of the aromatic compound unit represented by the above formula (2) with concentrated sulfuric acid for sulfonation, so as to introduce sulfonic acid side-chain groups. Moreover, monomers corresponding to the above formulas (1) and (2) are the same as in the case of the polymer electrolyte membrane 1 in the first embodiment.

Next, the sixth embodiment of the present invention will be explained below.

In the polymer electrolyte fuel cell of the present embodiment as shown in FIG. 1, the catalyst layer 5 is formed as follows:

First, carbon black (furnace black) is uniformly mixed at a certain weight ratio with a solution obtained by dissolving an ion conducting material comprising a sulfonated polyarylene in a solvent such as N-methylpyrrolidone, so as to prepare a paste. Then, the paste is screen printed on the primary layer of the backing layer 4 followed by drying, so that an ion conducting material layer containing the above carbon black is formed.

Thereafter, the above ion conducting material layer as well as the backing layer 4 consisting of a carbon paper and the primary layer is immersed in an aqueous solution containing a noble metal complex as a catalyst and at least one type of additive selected from a group consisting of an aqueous organic solvent, a nonionic surfactant and a non-metallic base. Thereafter, the above noble metal ion is exchanged for the hydrogen ion of the sulfonic acid group of the sulfonated polyarylene, which forms the above ion conducting material layer.

Subsequently, the above noble metal ion is reduced so as to generate a catalyst only consisting of the noble metal, and the catalyst then forms the catalyst layer 5 supported by the above ion conducting material layer.

The constitutions of the polymer electrolyte fuel cell of the present embodiment other than the constitution regarding the catalyst layer are completely identical to the polymer electrolyte fuel cell of the first embodiment. Accordingly, the polymer electrolyte fuel cell of the present embodiment can be formed in the same manner as in the first embodiment.

The sulfonated polyarylene, which forms the above ion conducting binder, is obtained by reacting a polyarylene polymer consisting of 30 to 95 mol % of the aromatic compound unit represented by the above formula (1) and 70 to 5 mol % of the aromatic compound unit represented by the above formula (2) with concentrated sulfuric acid for sulfonation, so as to introduce sulfonic acid side-chain groups. Moreover, monomers corresponding to the above formulas (1) and (2) are the same as in the case of the polymer electrolyte membrane 1 of the first embodiment.

A complex salt containing $Pt[NH_3]_4^{2+}$ is an example of the complex of the above noble metal. Examples of the above aqueous organic solvent used for the above additive include methanol, ethanol, and ethylene glycol. Examples of the above nonionic surfactant include polyoxyethylene dodecyl ether and polyoxyethylene octyl phenyl ether. Furthermore, an example of the above non-metallic base includes ammonium.

The reduction of the above noble metal ion can be carried out, for example, using a reducing aqueous solution containing sodium borohydride and sodium carbonate.

The above carbon black contained in the catalyst layer 5 acts as a conductive particle therein.

Next, the present invention will be described further in detail in the following examples and comparative examples.

EXAMPLE 1

In the present example, first, a sulfonated polyarylene represented by the following formula (3) was dissolved in N-methylpyrrolidone, and thereafter, a polymer electrolyte membrane 1 having a dry film thickness of 50 μm and an ion exchange capacity of 2.3 meq/g was prepared by the cast method.

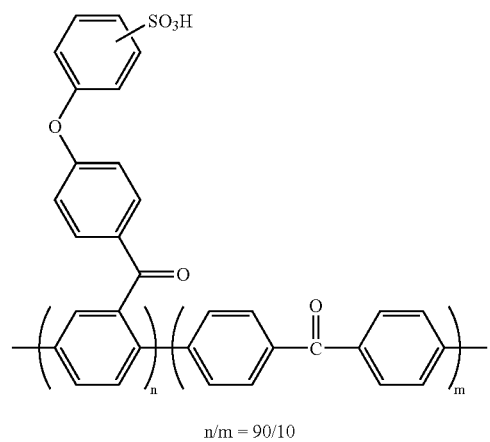

n/m = 90/10

(3)

Thereafter, carbon black was mixed with polytetrafluoroethylene (PTFE) at a weight ratio of carbon black: PTFE=2:3, and the mixture was uniformly dispersed in ethylene glycol, so as to obtain a slurry. The obtained slurry was applied on the one side of a carbon paper followed by drying, so as to obtain a primary layer. Thus, a backing layer 4 consisting of the carbon paper and the primary layer was produced. Two of the same above backing layers 4 were prepared for each of an oxygen electrode 2 side and a fuel electrode 3 side.

Thereafter, a catalyst particle consisting of platinum supported by carbon black was uniformly mixed with an ion conducting binder to prepare a catalyst paste. In the above catalyst particle, the weight ratio of carbon black to platinum was 1:1. The above ion conducting binder was obtained by dissolving a perfluoroalkylene sulfonic acid polymer (Nafion (product name) by DuPont) in N-methylpyrrolidone. In the above catalyst paste, the above catalyst particle was uniformly mixed with the ion conducting binder at a weight ratio of catalyst particle:binder=8:5.

Thereafter, the above catalyst paste was screen printed on the above primary layer, so that 0.5 mg/cm² platinum was kept thereon. Then, drying was carried out to form a catalyst layer 5. The above drying was carried out by drying at 60° C. for 10 minutes and then vacuum drying at 120° C.

Thereafter, the polymer electrolyte membrane 1 sandwiched by the catalyst layers 5, 5 of the oxygen electrode 2 and the fuel electrode 3 was subjected to hot pressing, so as to form a polymer electrolyte fuel cell shown in FIG. 1. The hot pressing was carried out by performing the first pressing at 80° C. at 5 MPa for 2 minutes and then the second pressing at 160° C. at 4 MPa for 1 minute.

The dynamic viscoelastic coefficients of the polymer electrolyte membrane 1 and the ion conducting binder were measured in the tensile mode by a viscoelastic analyzer-RSAII (product name; Rheometric Science, Inc). Dynamic viscoelastic coefficient was defined as a value measured at 110° C. under the conditions of a frequency of 10 Hz (62.8 rad/second), a distortion of 0.05%, in a nitrogen current, and within a temperature range between room temperature and 350° C. As a result, in the present example, the dynamic viscoelastic coefficient at 110° C. of the polymer electrolyte membrane 1 was $4 \times 10^{10}$ Pa, and the dynamic viscoelastic coefficient at 110° C. of the ion conducting binder was $6.7 \times 10^{7}$ Pa. The results are shown in Table 1.

Subsequently, using the apparatus shown in FIG. 2, Q value was measured, which was an index of the adhesiveness of the polymer electrolyte membrane 1 to the oxygen electrode 2 and the fuel electrode 3 in the polymer electrolyte fuel cell in the present example.

Figure 2:
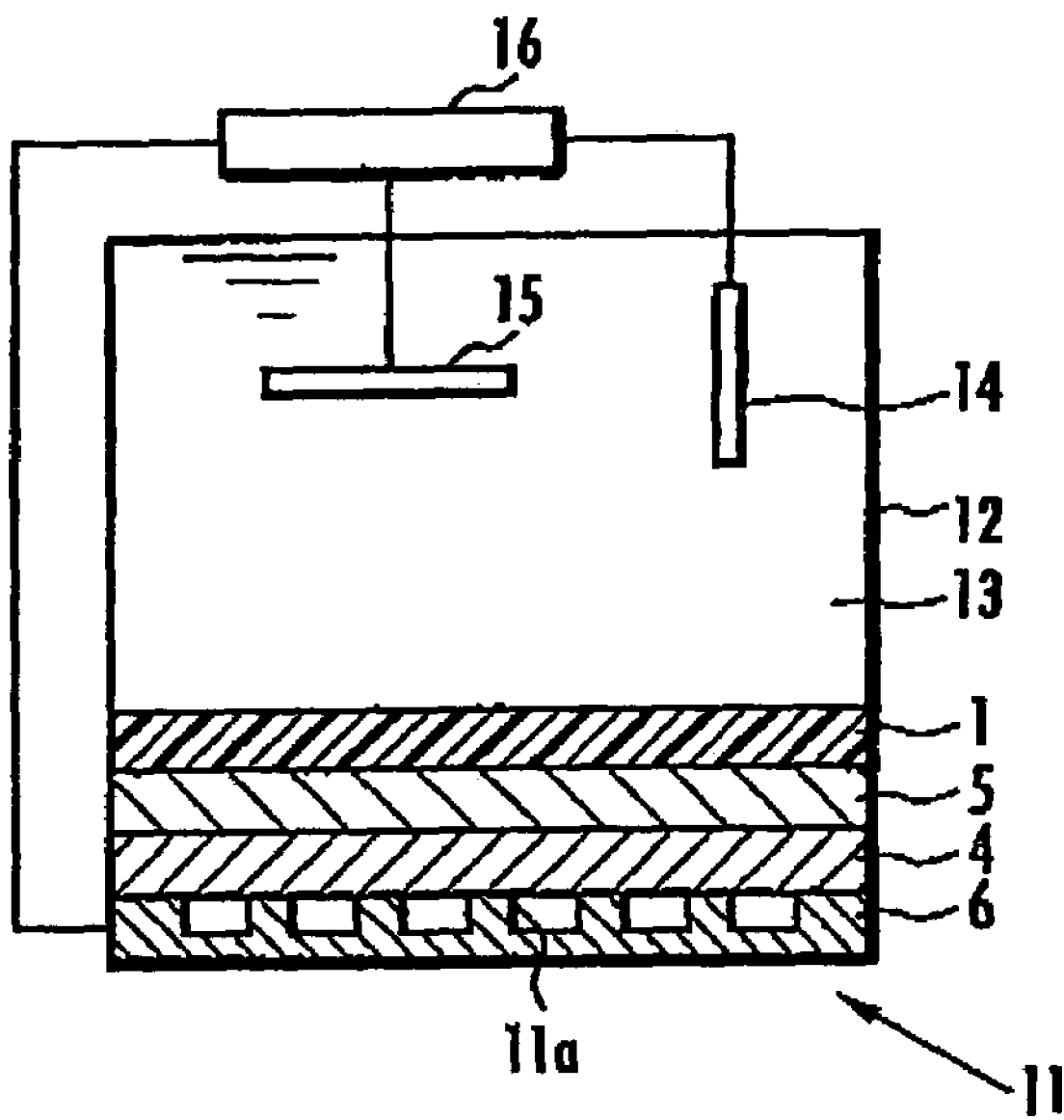
FIG. 2 is an illustrative view indicating the structure of an apparatus for measuring Q value of the polymer electrolyte fuel cell shown in FIG. 1.

The apparatus of FIG. 2 is configured such that an electrode 11 having a structure identical to the oxygen electrode 2 and the fuel electrode 3 of FIG. 1 was established on only a single side of the polymer electrolyte membrane 1 and that the thus established product was placed in the bottom of a tank 12, so as to make the polymer electrolyte membrane 1 with the electrode 11 to come into contact with a sulfuric acid aqueous solution 13 with pH 1 that was filled in the tank 12. The apparatus of FIG. 2 comprises a reference electrode 14 and a control electrode 15 that were immersed in the sulfuric acid aqueous solution 13. Each of the reference electrode 14, the control electrode 15, and the backing layer 4 of the electrode 11 was connected to a potentiostat 16. Moreover, the electrode 11 comprises a gas passage 11a, which corresponds to an oxygen passage 2a of the oxygen electrode 2 or a fuel passage 3a of the fuel electrode 3 as shown in FIG. 1. Thus, the electrode 11 is configured such that it freely comes into contact with nitrogen gas, which is supplied through the gas passage 11a.

In the apparatus of FIG. 2, when voltage is charged to the point between the backing layer 4 and the sulfuric acid aqueous solution 13 by the potentiostat 16, protons existing in the sulfuric acid aqueous solution 13 reach the electrode 11 through the polymer electrolyte membrane 1, and they receive electrons. This is to say, protons come into contact with the surface of platinum in the catalyst layer 5, so that electrons are transferred from the platinum to the protons. In the apparatus of FIG. 2, the amount of platinum in the catalyst layer 5 of the electrode 11 is 0.5 g/cm².

In contrast, when reverse voltage is charged thereto, electrons are transferred from hydrogen atoms adsorbing them to platinum, and the electrons are diffused as protons in the sulfuric acid aqueous solution.

Figure 3:
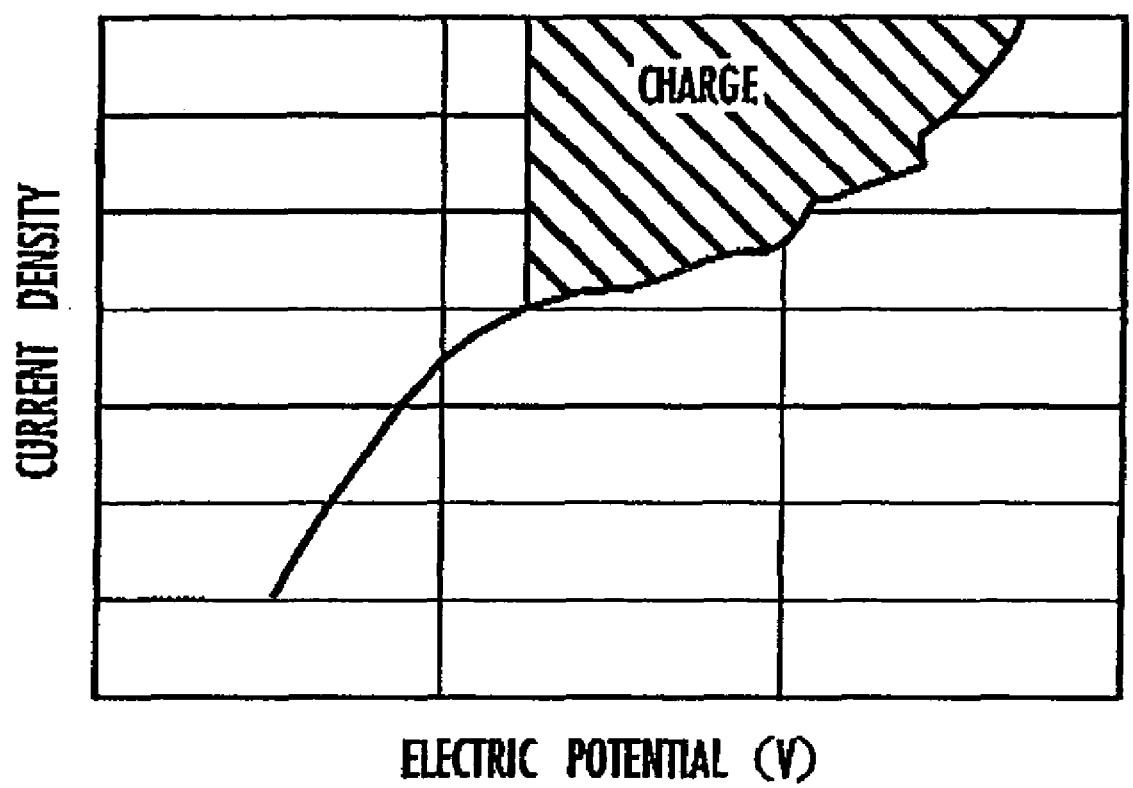
FIG. 3 is a graph showing a measurement example of Q value by the apparatus of FIG. 2.

Hence, when the voltage is scanned from −0.5 V to 1 V, as shown in FIG. 3, Q value can be obtained from the peak area of the adsorption side of protons. Herein, Q value shows the amount of charge (C/cm²) per area of the electrode 11. As this value is great, it indicates high adhesiveness of the electrode to the polymer electrolyte membrane.

In the polymer electrolyte fuel cell in the present example, the above Q value was 0.15° C./cm². The results are shown in Table 1.

Thereafter, the generated electric potential of the polymer electrolyte fuel cell in the present example and the ion conductivity of the above ion conducting binder were measured.

Air was supplied to the oxygen electrode 2, and pure hydrogen was supplied to the fuel electrode 3. When current density was 0.2 A/cm², cell potential was measured under the power generation conditions of a pressure of 100 kPa both in the oxygen electrode 2 and the fuel electrode 3, a utilization ratio of 50%, a relative humidity of 50%, and a temperature of 85° C. The cell potential was defined as an electric potential. In the present example, the polymer electrolyte fuel cell had an electric potential of 0.81 V. The results are shown in Table 1.

With regard to ion conductivity, the ion conducting binder was converted into a film state, and ion conductivity was obtained in the surface direction from the resistance and the film thickness obtained under the conditions of an impressed voltage of 1 V and a frequency of 10 kHz, which were measured by the alternating two-terminal method. The measurement of the above resistance was carried out under the atmosphere of 25° C. and a relative humidity of 90%. After the measurement of the above resistance, the sample obtained by converting the ion conducting binder into a film state was left for 12 hours or longer under the atmosphere of 25° C. and a relative humidity of 50%. Thereafter, the above film thickness was measured. In the present example, the polymer electrolyte fuel cell had an ion conductivity of 0.12 S/cm. The results are shown in Table 1.

Figure 4:
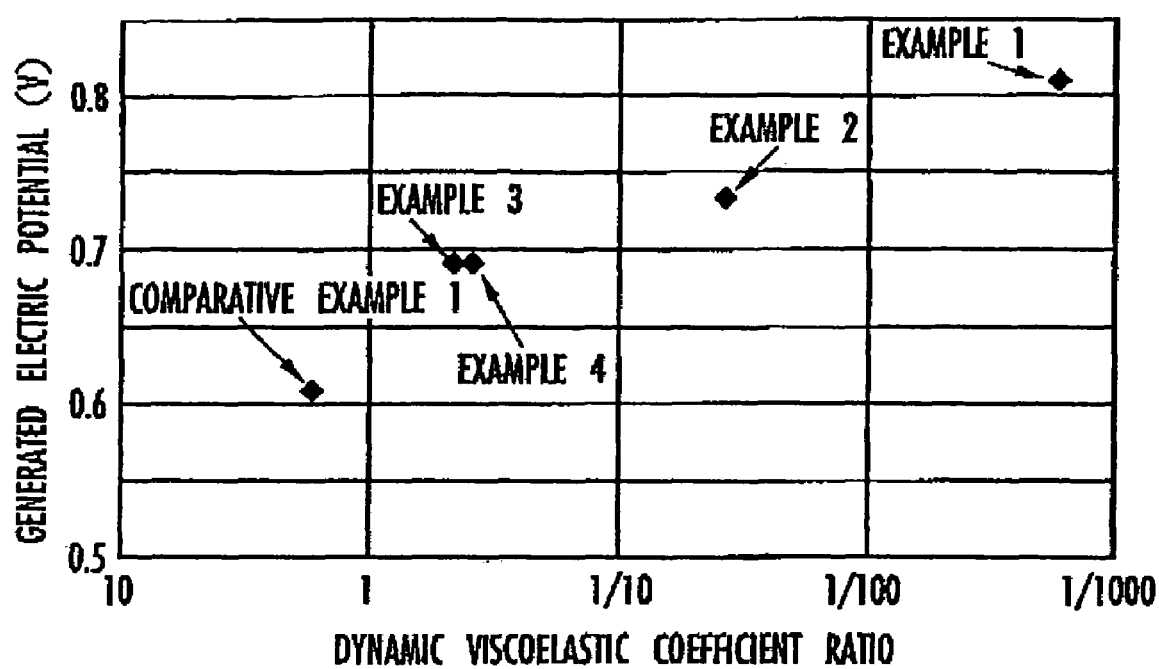
FIG. 4 is a graph showing the relationship between the ratio of the dynamic viscoelastic coefficient at 110° C. of a polymer electrolyte membrane and that of an ion conducting polymer binder and the generated electric potential in a polymer electrolyte fuel cell in the first aspect of the present invention.

FIG. 4 shows the relationship between the ratio of the dynamic viscoelastic coefficient at 110° C. of the polymer electrolyte membrane and that of the ion conducting polymer binder and the generated electric potential.

EXAMPLE 2

In the present example, the polymer electrolyte fuel cell of FIG. 1 was formed completely in the same manner as in Example 1 with the exception that a sulfonated polyether ether ketone represented by the following formula (6) (ion exchange capacity of which was 1.5 meq/g) was used as an ion conducting binder.

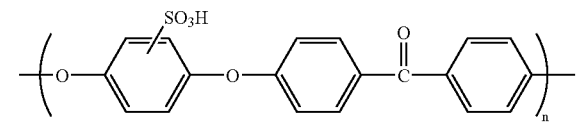

(6)

Thereafter, the dynamic viscoelastic coefficient at 110° C. of the ion conducting binder, and the Q value, electric potential, and ion conductivity of the polymer electrolyte fuel cell were measured completely in the same manner as in Example 1.

The dynamic viscoelastic coefficient at 110° C. of the ion conducting binder was $1.5 \times 10^{9}$ Pa in the present example.

Moreover, the Q value of the polymer electrolyte fuel cell was 0.135° C./cm², the electric potential was 0.73 V, and the ion conductivity was 0.14 in the present example. The results are shown in Table 1.

Furthermore, the relationship between the ratio of the dynamic viscoelastic coefficient at 110° C. of the polymer electrolyte membrane and that of an ion conducting polymer binder and the generated electric potential is shown in FIG. 4.

EXAMPLE 3

In the present example, the polymer electrolyte fuel cell of FIG. 1 was formed completely in the same manner as in Example 1 with the exception that a sulfonated polyarylene represented by the following formula (5) (ion exchange capacity of which was 1.7 meq/g) was used as an ion conducting binder.

ether ketone represented by the following formula (7) (ion exchange capacity of which was 2.0 meq/g) was used as an ion conducting binder.

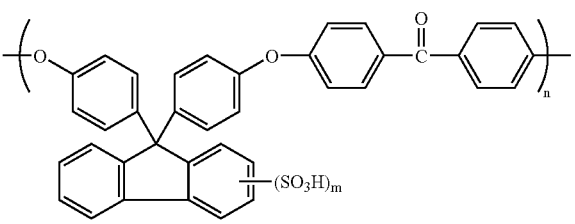

(7)

Thereafter, the dynamic viscoelastic coefficient at 110° C. of the ion conducting binder, and the Q value, electric

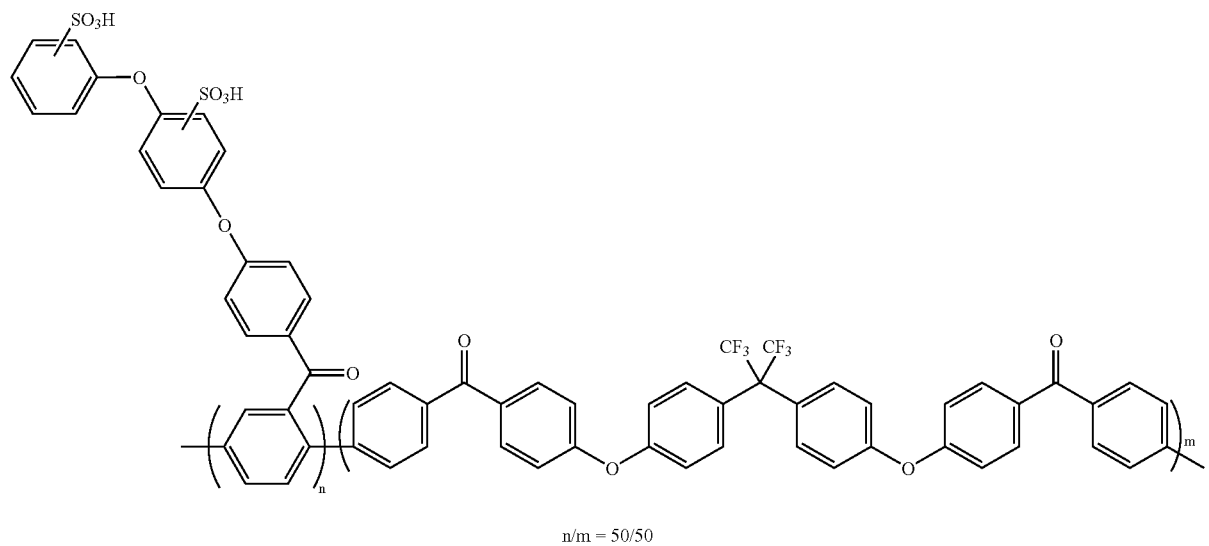

(5)

n/m = 50/50

Thereafter, the dynamic viscoelastic coefficient at 110° C. of the ion conducting binder, and the Q value, electric potential, and ion conductivity of the polymer electrolyte fuel cell were measured completely in the same manner as in Example 1.

The dynamic viscoelastic coefficient at 110° C. of the ion conducting binder was $1.5 \times 10^{10}$ Pa in the present example. Moreover, the Q value of the polymer electrolyte fuel cell was 0.09° C./cm², the electric potential was 0.69 V, and the ion conductivity was 0.14 in the present example. The results are shown in Table 1.

Furthermore, the relationship between the ratio of the dynamic viscoelastic coefficient at 110° C. of the polymer electrolyte membrane and that of the ion conducting polymer binder and the generated electric potential is shown in FIG. 4.

EXAMPLE 4

In the present example, the polymer electrolyte fuel cell of FIG. 1 was formed completely in the same manner as in Example 1 with the exception that a sulfonated polyether potential, and ion conductivity of the polymer electrolyte fuel cell were measured completely in the same manner as in Example 1.

The dynamic viscoelastic coefficient at 110° C. of the ion conducting binder was $1.8 \times 10^9$ Pa in the present example. Moreover, the Q value of the polymer electrolyte fuel cell was 0.09° C./cm², the electric potential was 0.69 V, and the ion conductivity was 0.08 in the present example. The results are shown in Table 1.

Furthermore, the relationship between the ratio of the dynamic viscoelastic coefficient at 110° C. of the polymer electrolyte membrane and that of the ion conducting polymer binder and the generated electric potential is shown in FIG. 4.

COMPARATIVE EXAMPLE 1

In the present comparative example, the polymer electrolyte fuel cell of FIG. 1 was formed completely in the same manner as in Example 1 with the exception that a sulfonated polyarylene represented by the following formula (8) (ion exchange capacity of which was 2.4 meq/g) was used as an ion conducting binder.

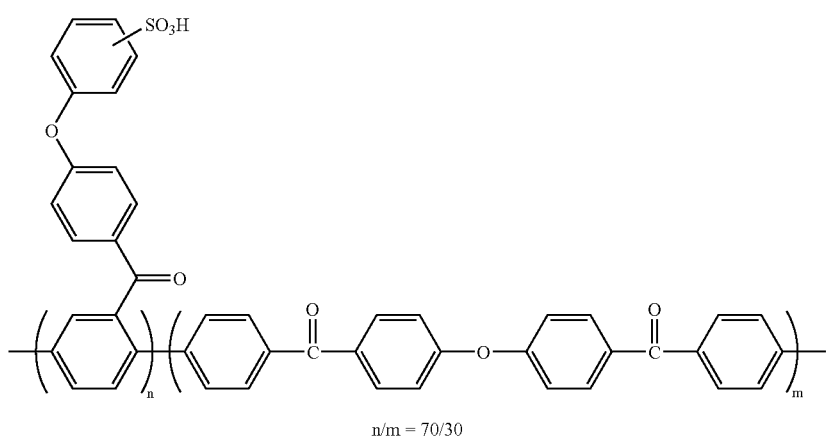

(8)

n/m = 70/30

Thereafter, the dynamic viscoelastic coefficient at 110° C. of the ion conducting binder, and the Q value, electric potential, and ion conductivity of the polymer electrolyte fuel cell were measured completely in the same manner as in Example 1.

The dynamic viscoelastic coefficient at 110° C. of the ion conducting binder was $6.7 \times 10^{10}$ Pa in the present comparative example. This value was greater than the dynamic viscoelastic coefficient at 110° C. of the polymer electrolyte membrane 1. Moreover, the Q value of the polymer electrolyte fuel cell was 0.05° C./cm$^2$, the electric potential was 0.61 V, and the ion conductivity was 0.07 in the present comparative example. The results are shown in Table 1.

Furthermore, the relationship between the ratio of the dynamic viscoelastic coefficient at 110° C. of the polymer electrolyte membrane and that of the ion conducting polymer binder and the generated electric potential is shown in FIG. 4.

TABLE 1

| | Dynamic viscoelastic coefficient at 110° C. | | | Electric | Ion |
| | Electrolyte membrane | Binder | Q value (C/cm$^2$) | potential (V) | conductivity (S/cm) |
|---|---|---|---|---|---|
| Example 1 | $4 \times 10^{10}$ | $6.5 \times 10^{7}$ | 0.15 | 0.81 | 0.12 |
| Example 2 | $4 \times 10^{10}$ | $1.5 \times 10^{9}$ | 0.135 | 0.73 | 0.14 |
| Example 3 | $4 \times 10^{10}$ | $1.5 \times 10^{10}$ | 0.09 | 0.69 | 0.14 |
| Example 4 | $4 \times 10^{10}$ | $1.8 \times 10^{10}$ | 0.09 | 0.69 | 0.08 |
| Comparative example 1 | $4 \times 10^{10}$ | $6.7 \times 10^{10}$ | 0.05 | 0.61 | 0.07 |

In Examples 1 to 4, the dynamic viscoelastic coefficient at 110° C. of the ion conducting binder is smaller than that of the polymer electrolyte membrane. In Comparative example 1, the dynamic viscoelastic coefficient at 110° C. of the ion conducting binder is greater than that of the polymer electrolyte membrane. From Table 1 and FIG. 4, it is clear that Q value of each of Examples 1 to 4 is greater than that of Comparative example 1, and that accordingly the electric potential of each of Examples 1 to 4 is also higher than that of Comparative example 1.

EXAMPLE 5

In the present example, first, a sulfonated polyarylene represented by the following formula (3) was dissolved in N-methylpyrrolidone, and thereafter, a polymer electrolyte membrane 1 having a dry film thickness of 50 μm was prepared by the cast method.

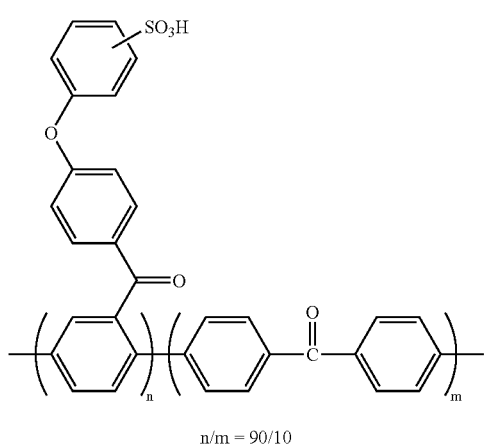

(3)

n/m = 90/10

Thereafter, carbon black was mixed with polytetrafluoroethylene (PTFE) at a weight ratio of carbon black: PTFE=2:3, and the obtained mixture was uniformly dispersed in ethylene glycol, so as to prepare a slurry. The obtained slurry was then applied on the one side of a carbon paper followed by drying, so as to obtain a primary layer. Thus, a backing layer 4 consisting of the carbon paper and the primary layer was produced. Two of the same above backing layers 4 were prepared for each of an oxygen electrode 2 side and a fuel electrode 3 side.

Thereafter, a catalyst particle consisting of platinum supported by furnace black having a specific surface area of 800 m²/g or larger was uniformly mixed with an ion conducting binder to prepare a catalyst paste. In the above catalyst particle, the weight ratio of furnace black to platinum was 1:1. The above ion conducting binder was an N-methylpyrrolidone solution containing the sulfonated polyarylene represented by the above formula (3). In the above catalyst paste, the above catalyst particle was uniformly mixed with the ion conducting binder at a weight ratio of catalyst particle binder=1:1.25.

Thereafter, the above catalyst paste was screen printed on the above primary layer, so that 0.5 mg/cm² platinum was kept thereon. Then, drying was carried out to form a catalyst layer 5. The above drying was carried out by drying at 60° C. for 10 minutes and then vacuum drying at 120° C.

The sulfonated polyarylene represented by the above formula (3) had an ion exchange capacity of 2.3 meq/g and contained 27% by weight of water under the environment of 80° C. and a relative humidity of 90%. Moreover, the ion conducting binder comprising the sulfonated polyarylene represented by the above formula (3) coated 84 m²/g of the surface area of the platinum supported by the above furnace black.

Thereafter, the polymer electrolyte membrane 1 sandwiched by the catalyst layers 5, 5 of the oxygen electrode 2 and the fuel electrode 3 was subjected to hot pressing at 160° C. at 4 MPa for 1 minute, so as to form a polymer electrolyte fuel cell shown in FIG. 1.

Subsequently, completely in the same manner as in the above described Example 1, Q value was measured, which was an index of the adhesiveness of the polymer electrolyte membrane 1 to the oxygen electrode 2 and the fuel electrode 3 in the polymer electrolyte fuel cell in the present example. In the polymer electrolyte fuel cell in the present example, the Q value was 0.155° C./cm².

Figure 5:
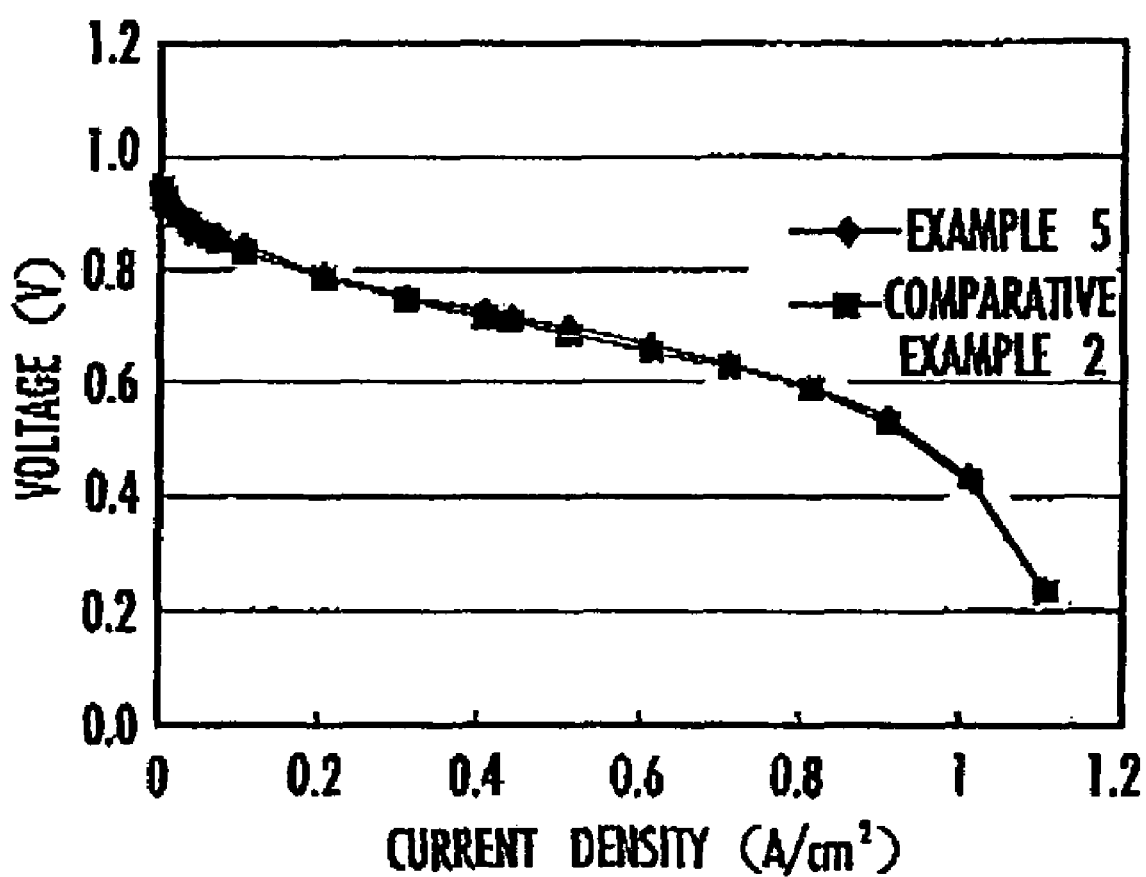
FIG. 5 is a graph showing the power generation efficiency of a polymer electrolyte fuel cell in the second aspect of the present invention.

Thereafter, to examine the power generation efficiency of the polymer electrolyte fuel cell in the present example, the change of the voltage (V) to the current density (A/cm²) under the environment of 80° C. and a relative humidity of 90% was measured. The results are shown in FIG. 5.

COMPARATIVE EXAMPLE 2

In the present comparative example, the polymer electrolyte fuel cell of FIG. 1 was formed completely in the same manner as in Example 1 with the exception that the polymer electrolyte membrane 1 comprising a perfluoroalkylene sulfonic acid polymer (Nafion (product name) by DuPont) was used and that a catalyst paste was prepared using the above perfluoroalkylene sulfonic acid polymer as an ion conducting binder. The above catalyst paste was obtained by uniformly mixing the above catalyst particles in an isopropanol/n-propanol solution containing the above ion conducting binder.

Thereafter, to examine the power generation efficiency of the polymer electrolyte fuel cell in the present comparative example, the change of the voltage (V) to the current density (A/cm²) under the environment of 80° C. and a relative humidity of 90% was measured. The results are shown in FIG. 5.

From FIG. 5, it is clear that the polymer electrolyte fuel cell of Example 5 can have a power generation efficiency equivalent to that of the polymer electrolyte fuel cell of Comparative example 5, in which the above perfluoroalkylene sulfonic acid polymer was used as the polymer electrolyte membrane 1 and the ion conducting binder.

EXAMPLE 6

In the present example, first, a sulfonated polyarylene represented by the following formula (3) was dissolved in N-methylpyrrolidone, and thereafter, a polymer electrolyte membrane 1 having a dry film thickness of 50 µm was prepared by the cast method. The sulfonated polyarylene polymer had an ion exchange capacity of 2.3 meq/g.

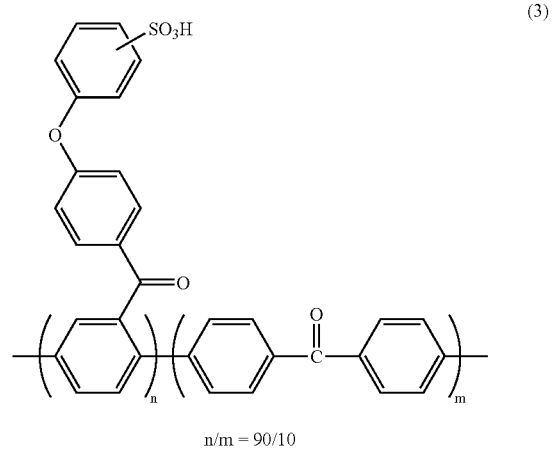

n/m = 90/10

Thereafter, carbon black was mixed with polytetrafluoroethylene (PTFE) at a weight ratio of carbon black:PTFE=2:3, and the obtained mixture was uniformly dispersed in ethylene glycol, so as to prepare a slurry. The obtained slurry was then applied on the one side of a carbon paper followed by drying, so as to obtain a primary layer. Thus, a backing layer 4 consisting of the carbon paper and the primary layer was produced. Two of the same above backing layers 4 were prepared for each of an oxygen electrode 2 side and a fuel electrode 3 side.

Thereafter, a catalyst particle that consists of platinum supported by furnace black that is made of pores that are 800 m²/g in specific surface area and 100 nm or shorter in diameter, having a pore volume of 10 to 20 ml/g, was uniformly mixed with an ion conducting binder to prepare a catalyst paste. In the above catalyst particle, the weight ratio of furnace black to platinum was 1:1. The above ion conducting binder was an N-methylpyrrolidone solution containing a sulfonated polyarylene represented by the following formula (5). In the above catalyst paste, the above catalyst particle was uniformly mixed with the ion conducting binder at a weight ratio of catalyst particle:binder=1:1.25. The sulfonated polyarylene represented by the following formula (5) had an ion exchange capacity of 2.0 meq/g.

(5)

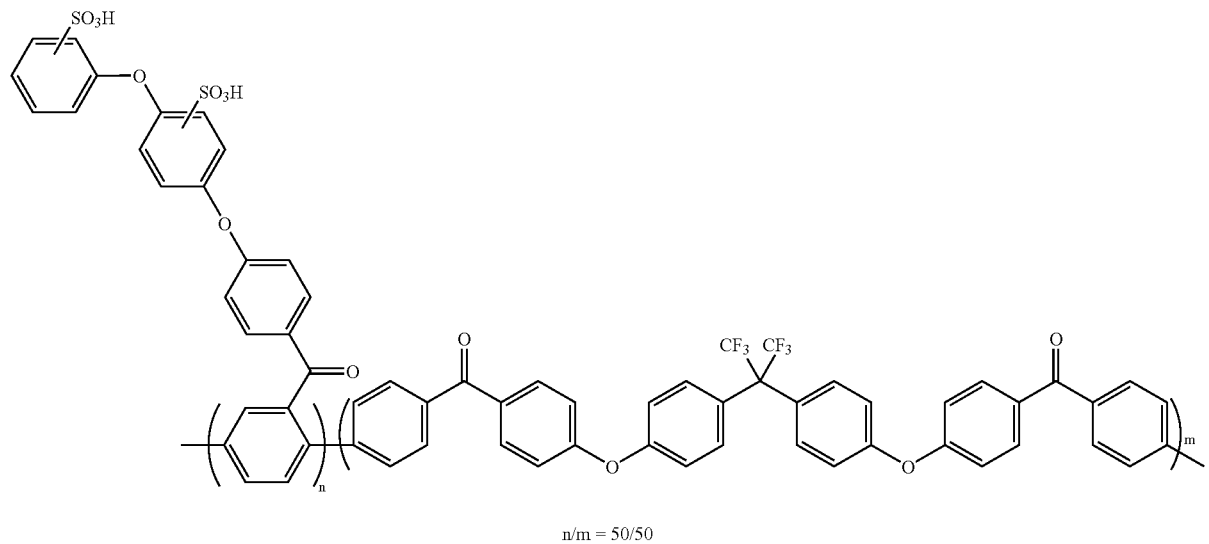

n/m = 50/50

Thereafter, the above catalyst paste was screen printed on the above primary layer, so that 0.5 mg/cm² platinum was kept thereon. Then, drying was carried out to form a catalyst layer 5. The above drying was carried out by drying at 60° C. for 10 minutes and then vacuum drying at 120° C.

The ion conducting binder comprising the sulfonated polyarylene represented by the above formula (5) coated 50 m²/g of the surface area of the platinum supported by the above furnace black.

Thereafter, the polymer electrolyte membrane 1 sandwiched by the catalyst layers 5, 5 of the oxygen electrode 2 and the fuel electrode 3 was subjected to hot pressing at 160° C. at 4 MPa for 1 minute, so as to form a polymer electrolyte fuel cell shown in FIG. 1.

Figure 6:
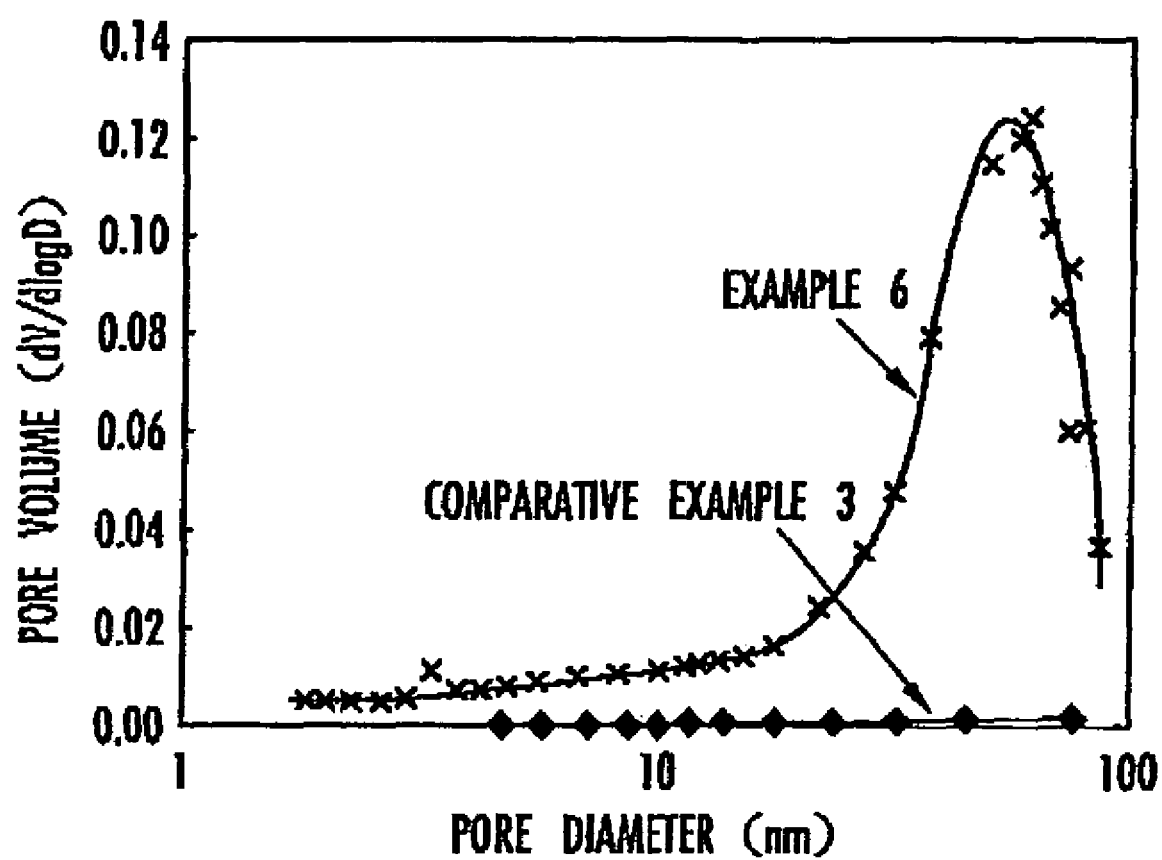
FIG. 6 is a graph showing the pore distribution of catalyst carriers in the catalyst layer of a polymer electrolyte fuel cell in the third aspect of the present invention.

Subsequently, the pore distribution of the above furnace black in the catalyst layer 5 of the polymer electrolyte fuel cell of the present example was measured. The results are shown in FIG. 6. In the polymer electrolyte fuel cell of the present example, the pore volume of the furnace black, which was made of pores having a diameter of 100 nm or shorter, was 1.2 ml/g.

Thereafter, using the apparatus of FIG. 2, oxygen gain was measured as an index of gas diffusibility in the catalyst layer 5 of the polymer electrolyte fuel cell of the present example.

In the apparatus of FIG. 2, when oxygen gas or air is supplied through the gas passage 11a instead of nitrogen gas in the first embodiment, protons existing in the sulfuric acid aqueous solution 13 reach the electrode 11 through the polymer electrolyte membrane 1, and they react with the above oxygen gas or air so as to generate electric power. Thus, the difference of electric potential between when the oxygen gas is supplied through the gas passage 11a and when the air is supplied therethrough was defined as oxygen gain.

The air contains approximately one fifth of the oxygen of pure oxygen. Accordingly, if the gas diffusibility of the electrode 11 (catalyst layer 5) is low, the oxygen contained in the air cannot be sufficiently used. The electric potential obtained when the air is supplied thought the gas passage 11a is significantly lower than that obtained when the oxygen is supplied therethrough, and the above oxygen gain thereby increases.

In contrast, when the gas diffusibility of the electrode 11 (catalyst layer 5) is good, the oxygen contained in the air can be sufficiently used. Accordingly, even when the air is supplied through the gas passage 11a, there can be generated the same electric potential as when the oxygen gas is supplied therethrough, and the above oxygen gain thereby decreases. In the polymer electrolyte fuel cell of the present example, the above oxygen gain was 27 mV.

Figure 7:
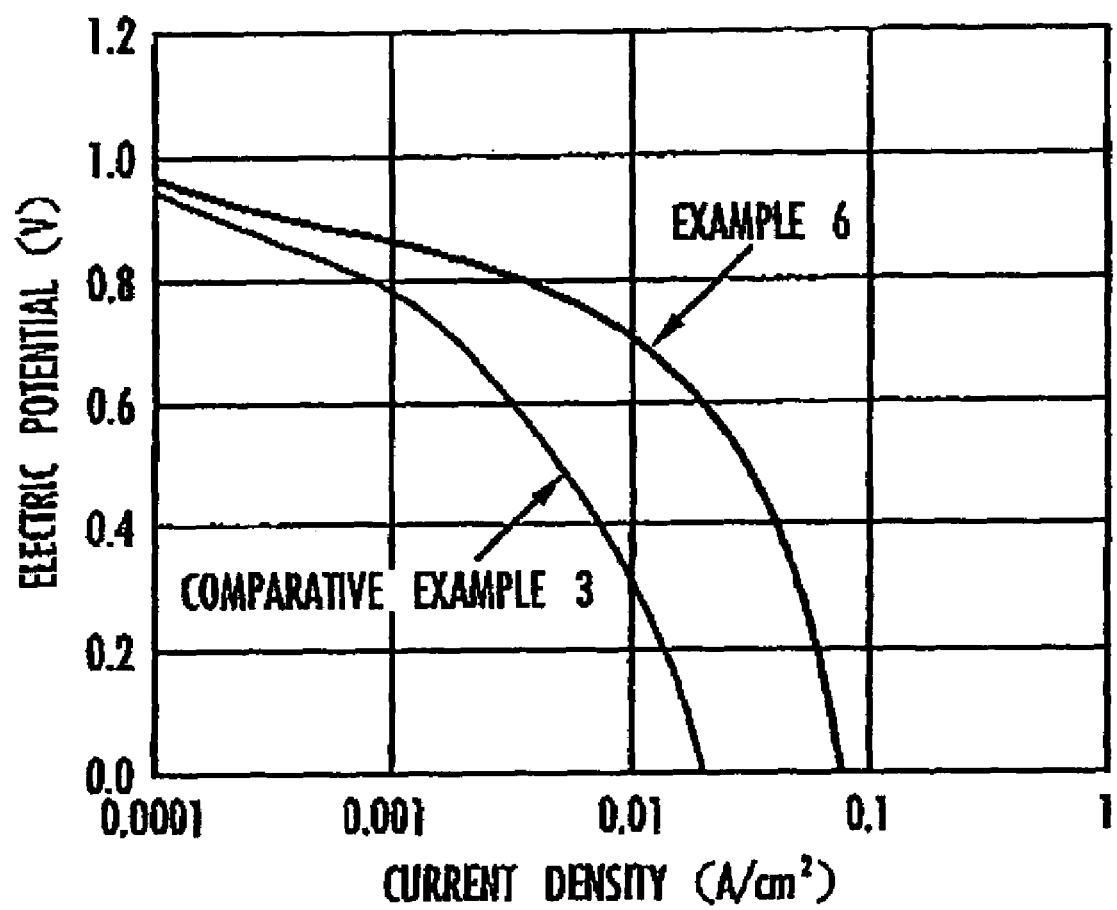
FIG. 7 is a graph showing the power generation efficiency of the electrode unit of a polymer electrolyte fuel cell in the third aspect of the present invention.

At the same time as the measurement of the oxygen gain, the change of the voltage (V) to the current density (A/cm²) was measured to examine the power generation efficiency when the air was supplied. The results are shown in FIG. 7.

Figure 8:
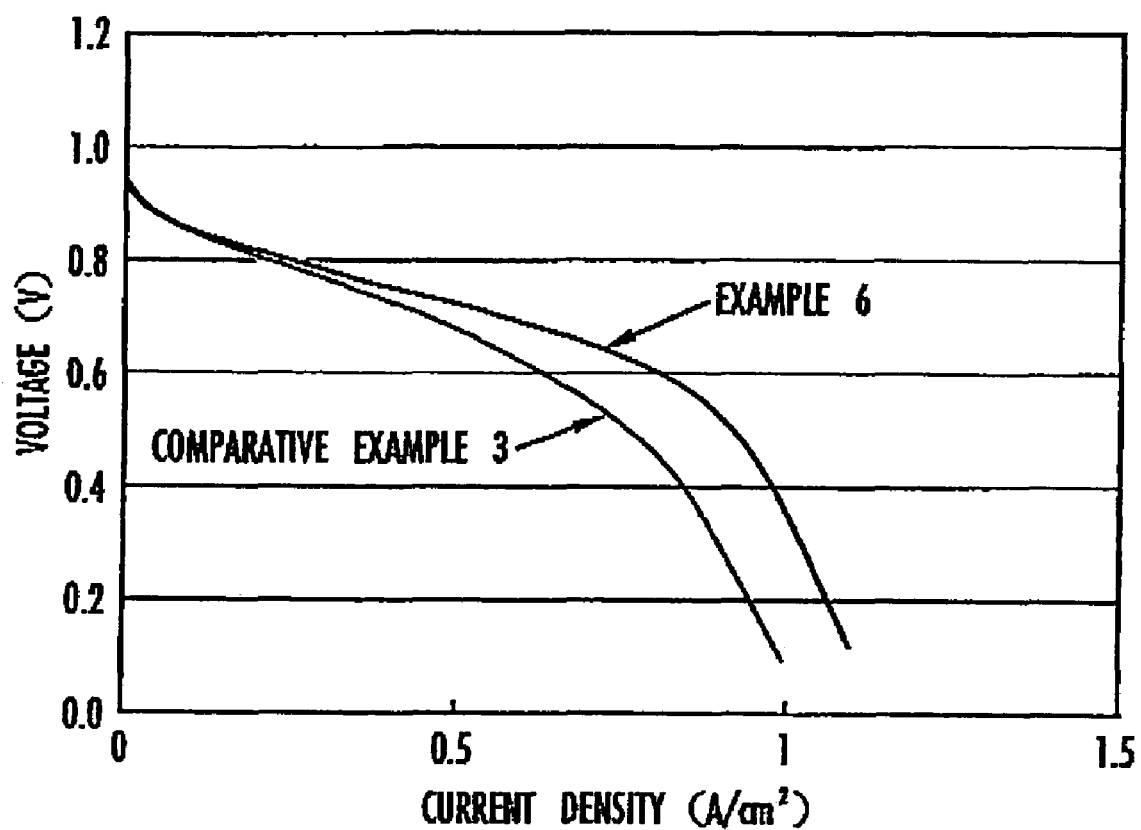
FIG. 8 is a graph showing the power generation efficiency of a polymer electrolyte fuel cell in the third aspect of the present invention.

Thereafter, to examine the power generation efficiency of the polymer electrolyte fuel cell of the present example, the change of the voltage (V) to the current density (A/cm²) under the environment of 80° C. and a relative humidity of 90% was measured. The results are shown in FIG. 8.

COMPARATIVE EXAMPLE 3

In the present comparative example, the polymer electrolyte fuel cell of FIG. 1 was formed completely in the same manner as in Example 6 with the exception that the sulfonated polyarylene represented by the above formula (3) was used to form the polymer electrolyte membrane 1 and the ion conducting binder.

Thereafter, the pore distribution of the above furnace black in the catalyst layer 5 of the polymer electrolyte fuel cell of the present comparative example was measured. The results are shown in FIG. 6. In the polymer electrolyte fuel cell of the present comparative example, the pore volume of the furnace black, which was made of of pores having a diameter of 100 nm or shorter, was 0.01 ml/g.

Thereafter, in the same manner as in Example 6, oxygen gain was measured as an index of gas diffusibility in the catalyst layer 5 of the polymer electrolyte fuel cell of the present comparative example. In the polymer electrolyte fuel cell of the present comparative example, the above oxygen gain was 260 mV.

At the same time as the measurement of the oxygen gain, the change of the voltage (V) to the current density (A/cm²) was measured to examine the power generation efficiency when the air was supplied. The results are shown in FIG. 7.

Thereafter, to examine the power generation efficiency of the polymer electrolyte fuel cell of the present comparative example, the change of the voltage (V) to the current density (A/cm$^2$) under the environment of 80° C. and a relative humidity of 90% was measured. The results are shown in FIG. 8.

From FIG. 6 and the measurement results of the above pore volume, it is clear that the polymer electrolyte fuel cell of Example 6 had a rate of blocking the pores of the furnace black, which is significantly lower than that of the polymer electrolyte fuel cell of Comparative example 3.

Moreover, the measurement results of the above oxygen gain clearly show that the polymer electrolyte fuel cell of Example 6 had significantly better gas diffusibility than the polymer electrolyte fuel cell of Comparative example 3.

As a result, as shown in FIGS. 7 and 8, it is clear that the polymer electrolyte fuel cell of Example 6 had a significantly better power generation efficiency than the polymer electrolyte fuel cell of Comparative example 3.

EXAMPLE 7

In the present example, first, a sulfonated polyarylene represented by the following formula (5) was dissolved in N-methylpyrrolidone, and thereafter, a polymer electrolyte membrane 1 having a dry film thickness of 50 μm and an ion exchange capacity of 2.0 meq/g was prepared by the cast method.

binder to prepare a catalyst paste. In the above catalyst particle, the weight ratio of furnace black to platinum was 1:1.

In the present example, as the above ion conducting binder, a catalyst paste for the oxygen electrode was prepared by dissolving a perfluoroalkylene sulfonic acid polymer (Nafion (product name) by DuPont) in isopropanol/n-propanol. In the above catalyst paste for the oxygen electrode, the above catalyst particle was uniformly mixed with the ion conducting binder at a weight ratio of catalyst particle:binder=1:1.25. Thereafter, the above catalyst paste was screen printed on the primary layer of the above backing layer 4, so that 0.5 mg/cm$^2$ platinum was kept thereon. Then, drying was carried out so as to form the oxygen electrode 2 comprising a catalyst layer 5 on the backing layer 4. The above drying was carried out by drying at 60° C. for 10 minutes and then vacuum drying at 120° C.

The above perfluoroalkylene sulfonic acid polymer used as the ion conducting binder of the above catalyst paste for the oxygen electrode had a water content of 5.5% at a temperature 80° C. and a relative humidity of 30%, and a water content of 7.5% at a relative humidity of 90%. Thus, it has a low water retention. Moreover, the above perfluoroalkylene sulfonic acid polymer had an ion conductivity of 0.04 S/cm at a temperature 80° C. and a relative humidity of 30%, and an ion conductivity of 0.12 S/cm at a relative humidity of 90%.

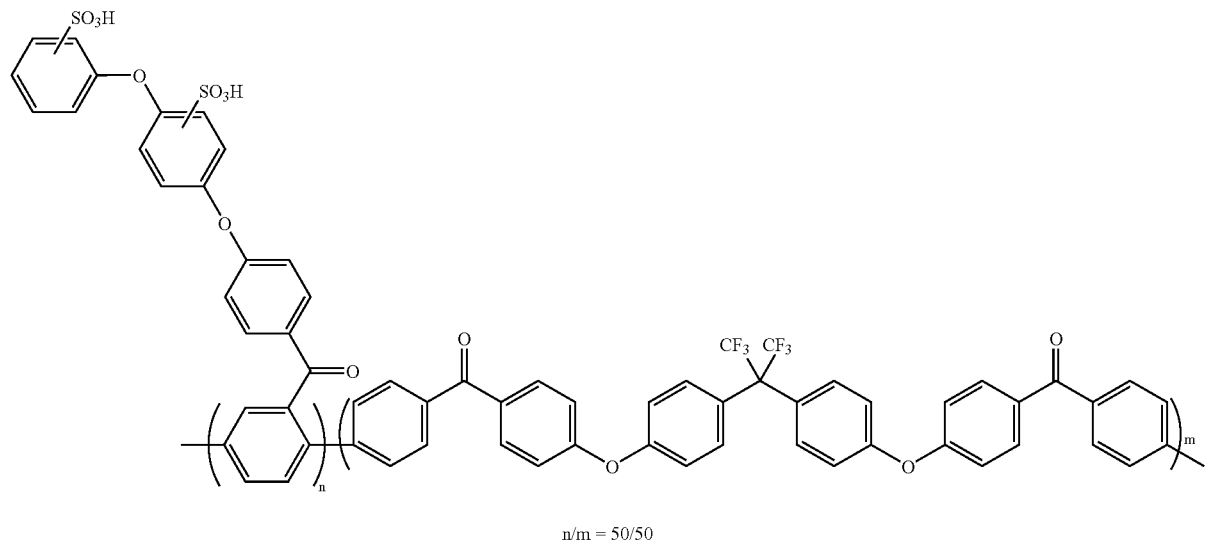

(5)

n/m = 50/50

Thereafter, carbon black was mixed with polytetrafluoroethylene (PTFE) at a weight ratio of carbon black:PTFE=2:3, and the obtained mixture was uniformly dispersed in ethylene glycol, so as to prepare a slurry. The obtained slurry was applied on the one side of a carbon paper followed by drying, so as to obtain a primary layer. Thus, a backing layer 4 consisting of the carbon paper and the primary layer was produced. Two of the same above backing layers 4 were prepared for each of an oxygen electrode 2 side and a fuel electrode 3 side.

Thereafter, a catalyst particle consisting of platinum supported by furnace black having a specific surface area of 800 m$^2$/g or larger was uniformly mixed with an ion conducting Thereafter, the fuel electrode 3 comprising the catalyst layer 5 on the backing layer 4 was formed completely in the same manner as in the case of the oxygen electrode 2 with the exception that a catalyst paste for the fuel electrode was prepared using an ion conducting binder obtained by dissolving the sulfonated polyarylene represented by the above formula (3) in N-methylpyrrolidone.

The above sulfonated polyarylene used as the ion conducting binder of the above catalyst paste for the fuel electrode had a water content of 19% at a temperature 80° C. and a relative humidity of 30%, and a water content of 28% at a relative humidity of 90%. Thus, it has a high water retention. Moreover, the above sulfonated polyarylene had an ion conductivity of 0.02 S/cm at a relative humidity of 30%, and an ion conductivity of 0.22 S/cm at a relative humidity of 90%. Thus, as the relative humidity is high, the ion conductivity increases.

Thereafter, the polymer electrolyte membrane 1 sandwiched by the catalyst layers 5, 5 of the oxygen electrode 2 and the fuel electrode 3 was subjected to hot pressing, so as to form a polymer electrolyte fuel cell shown in FIG. 1. The hot pressing was carried out at 160° C. at 4 MPa for 1 minute.

Figure 9:
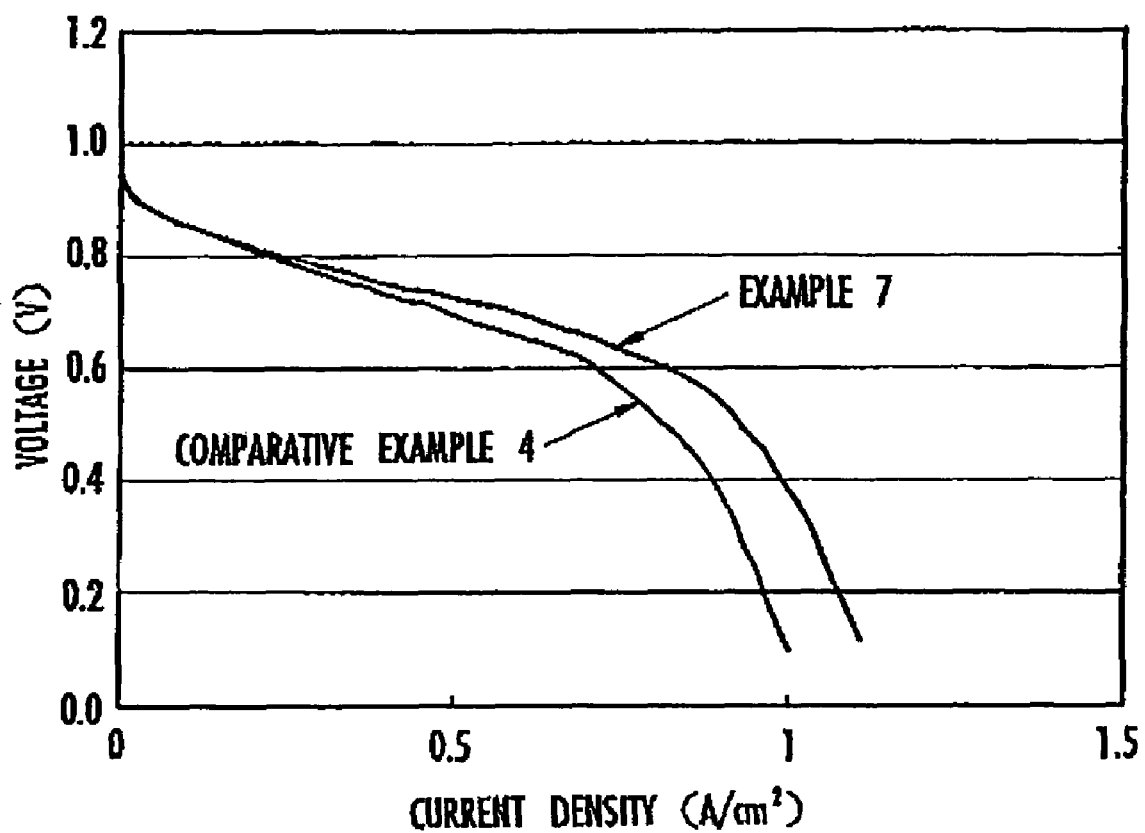
FIG. 9 is a graph showing the power generation efficiency of a polymer electrolyte fuel cell in the fourth aspect of the present invention.

Thereafter, to examine the power generation efficiency of the polymer electrolyte fuel cell of the present example, the voltage to the current density was measured at a temperature of 80° C. at a relative humidity of 90%. The results are shown in FIG. 9.

COMPARATIVE EXAMPLE 4

In the present comparative example, a catalyst paste for each of the oxygen and fuel electrodes was prepared, using an ion conducting binder obtained by dissolving the sulfonated polyarylene represented by the above formula (5) in N-methylpyrrolidone. Then, the polymer electrolyte fuel cell of FIG. 1 was formed completely in the same manner as in Example 7 with the exception that the catalyst layers 5, 5 of both electrodes were formed using the above catalyst paste.

Thereafter, to examine the power generation efficiency of the polymer electrolyte fuel cell of the present comparative example, the voltage to the current density was measured under the same conditions as in the above Example 7. The results are shown in FIG. 9.

FIG. 9 clearly shows that the polymer electrolyte fuel cell of Example 7, which used a perfluoroalkylene sulfonic acid polymer as an ion conducting binder forming the catalyst layer 5 of the oxygen electrode 2 and a sulfonated polyarylene as an ion conducting binder forming the catalyst layer of the fuel electrode 3, exerts an excellent power generation efficiency in the high current density region of 0.5 A/cm$^2$ or higher, when compared with the polymer electrolyte fuel cell of Comparative example 4, which used a sulfonated polyarylene as an ion conducting binder forming the catalyst layers 5, 5 of both the oxygen electrode 2 and fuel electrode 3.

EXAMPLE 8

In the present example, first, a sulfonated polyarylene represented by the following formula (5) was dissolved in N-methylpyrrolidone, and thereafter, a polymer electrolyte membrane 1 having a dry film thickness of 50 μm and an ion exchange capacity of 2.0 meq/g was prepared by the cast method.

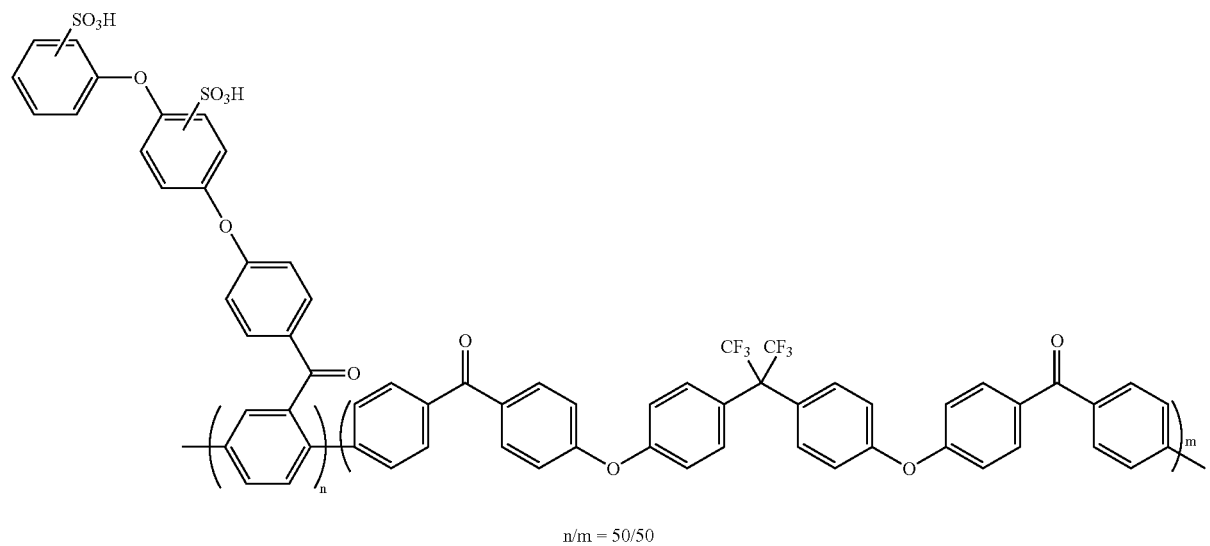

(5)

n/m = 50/50

Thereafter, carbon black was mixed with polytetrafluoroethylene (PTFE) at a weight ratio of carbon black: PTFE=2:3, and the obtained mixture was uniformly dispersed in ethylene glycol, so as to prepare a slurry. The obtained slurry was applied on the one side of a carbon paper followed by drying, so as to obtain a primary layer. Thus, a backing layer 4 consisting of the carbon paper and the primary layer was produced. Two of the same above backing layers 4 were prepared for each of an oxygen electrode 2 side and a fuel electrode 3 side.

Thereafter, a catalyst particle consisting of platinum supported by furnace black having a specific surface area of 800 m$^2$/g or larger was uniformly mixed with an ion conducting binder to prepare a catalyst paste. In the above catalyst particle, the weight ratio of furnace black to platinum was 1:1.

In the present example, as the above ion conducting binder, a catalyst paste for the oxygen electrode was prepared, using a product obtained by dissolving the sulfonated polyarylene represented by the above formula (5) in N-methylpyrrolidone. In the above catalyst paste for the oxygen electrode, the above catalyst particle was uniformly mixed with the ion conducting binder at a weight ratio of catalyst particle:binder=1:1.25. Thereafter, the above catalyst paste was screen printed on the primary layer of the above backing layer 4, so that 0.5 mg/cm$^2$ platinum was kept thereon. Then, drying was carried out to obtain a catalyst layer 5, so that the oxygen electrode 2 comprising the catalyst layer 5 on the backing layer 4 was formed. The above drying was carried out by drying at 60° C. for 10 minutes and then vacuum drying at 120° C.

The above sulfonated polyarylene used as the ion conducting binder of the above catalyst paste for the oxygen electrode had a water content of 19% at a relative humidity of 30%, and a water content of 28% at a relative humidity of 90%. Moreover, the above sulfonated polyarylene had an ion conductivity of 0.02 S/cm at a relative humidity of 30%, and an ion conductivity of 0.22 S/cm at a relative humidity of 90%. Thus, its ion conductivity was highly dependent on humidity.

Thereafter, the fuel electrode 3 comprising the catalyst layer 5 on the backing layer 4 was formed completely in the same manner as in the case of the oxygen electrode 2 with the exception that a catalyst paste for the fuel electrode was prepared using an ion conducting binder obtained by dissolving a perfluoroalkylene sulfonic acid polymer (Nafion (product name) by DuPont) in isopropanol/n-propanol.

The above perfluoroalkylene sulfonic acid polymer used as the ion conducting binder of the above catalyst paste for the fuel electrode had a water content of 5.5% at a relative humidity of 30%, and a water content of 7.5% at a relative humidity of 90%. Moreover, it had an ion conductivity of 0.04 S/cm at a relative humidity of 30%, and an ion conductivity of 0.12 S/cm at a relative humidity of 90%. Thus, its ion conductivity is less humidity-dependent than that of the above sulfonated polyarylene.

Thereafter, the polymer electrolyte membrane 1 sandwiched by the catalyst layers 5, 5 of the oxygen electrode 2 and the fuel electrode 3 was subjected to hot pressing, so as to form a polymer electrolyte fuel cell shown in FIG. 1. The hot pressing was carried out at 160° C. at 4 MPa for 1 minute.

Figure 10:
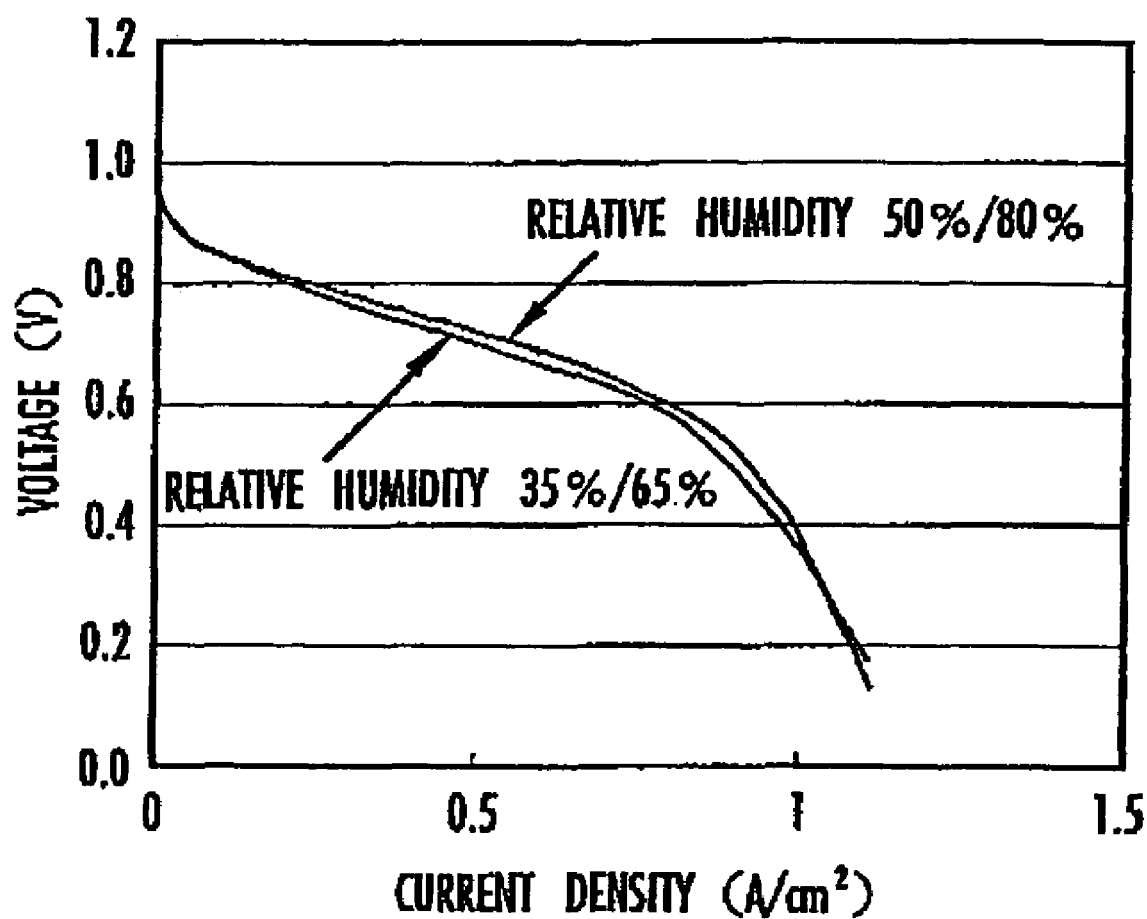
FIG. 10 is a graph showing the power generation efficiency of a polymer electrolyte fuel cell in the fifth aspect of the present invention.

Thereafter, to examine the power generation efficiency of the polymer electrolyte fuel cell of the present example, the voltage to the current density was measured both in the case of a relative humidity of 35%/65% and in the case of that of 50%/80%. The results are shown in FIG. 10.

COMPARATIVE EXAMPLE 5

In the present comparative example, both a catalyst paste for the oxygen electrode and a catalyst paste for the fuel electrodes were prepared, using an ion conducting binder obtained by dissolving the sulfonated polyarylene represented by the above formula (5) in N-methylpyrrolidone. Then, the polymer electrolyte fuel cell of FIG. 1 was formed completely in the same manner as in Example 8 with the exception that the catalyst layers 5, 5 of both electrodes were formed using the above catalyst paste.

Figure 11:
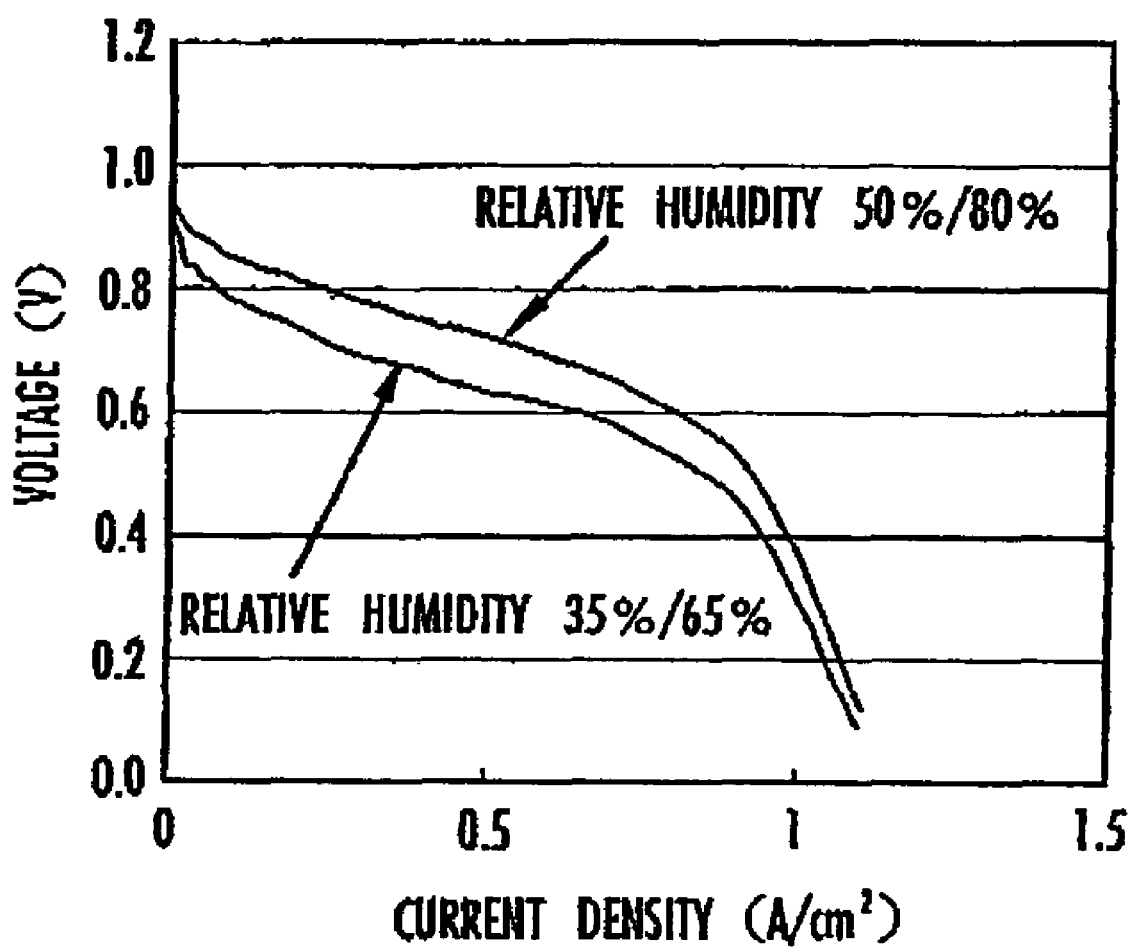
FIG. 11 is a graph showing the power generation efficiency of a polymer electrolyte fuel cell in a comparative example with respect to the fifth aspect of the present invention.

Thereafter, to examine the power generation efficiency of the polymer electrolyte fuel cell of the present comparative example, the voltage to the current density was measured both in the case of a relative humidity of 35%/65% and in the case of that of 50%/80%. The results are shown in FIG. 11.

FIG. 10 clearly shows that the polymer electrolyte fuel cell of Example 5, which used a sulfonated polyarylene as an ion conducting binder forming the catalyst layer 5 of the oxygen electrode 2 and a perfluoroalkylene sulfonic acid polymer as an ion conducting binder forming the catalyst layer 5 of the fuel electrode 3, exerts the same power generation efficiency both in the case of a relative humidity of 35%/65% and in the case of that of 50%/80%. In contrast, FIG. 11 clearly shows that the polymer electrolyte fuel cell of Comparative example 8, which used a sulfonated polyarylene as an ion conducting binder forming the catalyst layers 5, 5 of both the oxygen electrode 2 and the fuel electrode 3, had a significantly decreased power generation efficiency in the case of a relative humidity of 35%/65% compare to the case of that of 50%/80%.

EXAMPLE 9

In the present example, first, a sulfonated polyarylene represented by the following formula (5) (ion exchange capacity of which was 2.0 meq/g) was dissolved in N-methylpyrrolidone, and thereafter, a polymer electrolyte membrane 1 having a dry film thickness of 50 μm was prepared by the cast method.

(5)

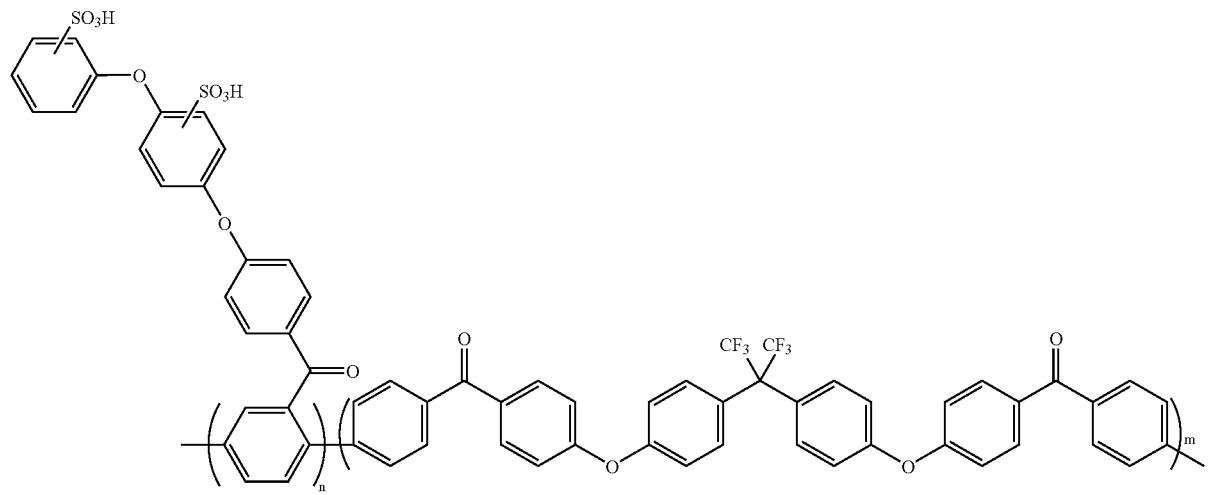

n/m = 50/50

Thereafter, carbon black was mixed with polytetrafluoroethylene (PTFE) at a weight ratio of carbon black: PTFE=2:3, and the obtained mixture was uniformly dispersed in ethylene glycol, so as to prepare a slurry. The obtained slurry was applied on the one side of a carbon paper followed by drying, so as to obtain a primary layer. Thus, a backing layer 4 consisting of the carbon paper and the primary layer was produced. Two of the same above backing layers 4 were prepared for each of an oxygen electrode 2 side and a fuel electrode 3 side.

Thereafter, furnace black was uniformly mixed in an N-methylpyrrolidone solution containing the sulfonated polyarylene represented by the above formula (5) at a weight ratio of furnace black:sulfonated polyarylene=1:1, so as to prepare a paste. Thereafter, the above paste was screen printed on the primary layer and then dried, so as to form the oxygen electrode 2 and the fuel electrode 3, both of which comprised an ion conducting material layer having a film thickness of 12 μm on the backing layer 4. The above drying was carried out by drying at 60° C. for 10 minutes and then vacuum drying at 120° C.

Thereafter, 250 ml of 25% ammonium water was added to 2000 ml of a solution containing 0.05 millimol/l $Pt[NH_3]_4^{2+}$ to prepare an ion exchange solution. The oxygen electrode 2 and the fuel electrode 3 both comprising the above ion conducting material layer were immersed in the ion exchange solution. The above ion exchange solution was heated to a temperature of 60° C. and then stirred under the above temperature for 12 hours, so as to exchange a Pt ion for the hydrogen ion of the sulfonic acid group of the above sulfonated polyarylene.

Thereafter, the above ion conducting material layer was washed with pure water to eliminate unreacted $Pt[NH_3]_4^{2+}$ and the ammonium water.

Thereafter, the oxygen electrode 2 and the fuel electrode 3 both comprising the above ion conducting material layer were immersed in pure water, and the pure water was then heated to 50° C. Then, a reducing aqueous solution containing sodium borohydride and sodium carbonate was dropped in the pure water under the above temperature over 30 minutes. Thereafter, the solution was left for approximately 1.5 hours, so that the Pt ion in the above ion conducting material layer was reduced to generate a Pt catalyst. The reduction was terminated when no hydrogen was generated from the solution in which the above reducing aqueous solution was dropped.

Subsequently, the above ion conducting material layer was washed with pure water so as to eliminate sodium derived from the above reducing aqueous solution. Then, the oxygen electrode 2 and the fuel electrode 3 both comprising the above ion conducting material layer were dried at 60° C. for 4 hours, so as to form the oxygen electrode 2 and the fuel electrode 3 both comprising a catalyst layer 5. The catalyst layer 5 contained 0.07 mg/cm$^2$ Pt.

Thereafter, the polymer electrolyte membrane 1 sandwiched by the catalyst layers 5, 5 of the oxygen electrode 2 and the fuel electrode 3 was subjected to hot pressing, so as to form a polymer electrolyte fuel cell shown in FIG. 1. The hot pressing was carried out at 160° C. at 4 MPa for 1 minute.

Thereafter, to examine the power generation efficiency of the polymer electrolyte fuel cell of the present example, the change of the voltage to the current density was measured. The results are shown in FIG. 12.

It should be noted that, in the present example, the above ion conducting material layer was formed on the primary layer of the backing layer 4, but it may be formed on the polymer electrolyte membrane 1, and the catalyst layer 5 may be formed by carrying out the same above ion exchange and reduction treatment. In this case, the polymer electrolyte fuel cell of FIG. 1 can be formed by hot pressing under the same above conditions, the polymer electrolyte membrane 1 comprising the catalyst layers 5, 5 on both sides thereof, which is sandwiched between the primary layers of the oxygen electrode 2 and the fuel electrode 3.

Otherwise, the above ion conducting material layer may be formed on a plate made from a fluorinated ethylene propylene copolymer (FEP) instead of on the above backing layer 4, and then the above ion exchange and reduction treatment may be carried out to form the catalyst layer 5. The above plate is used for electrode printing. In this case, the polymer electrolyte fuel cell of FIG. 1 can be formed by hot pressing the polymer electrolyte membrane 1 sandwiched between the catalyst layers 5, 5 of the oxygen electrode 2 and the fuel electrode 3 and then peeling the plate.

COMPARATIVE EXAMPLE 6

In the present comparative example, a catalyst particle consisting of platinum supported by furnace black at a weight ratio of furnace black:Pt=1:1 was uniformly mixed into an isopropanol/n-propanol solution containing a perfluoroalkylene sulfonic acid polymer (Nafion (product name) by DuPont) at a weight ratio of catalyst particle: Nafion=8:5, so as to prepare a catalyst paste. Thus, a polymer electrolyte fuel cell was formed in the same manner as in Example 9 with the exception that the above catalyst paste was screen printed on the primary layer of the above backing layer 4, so that 0.5 mg/cm$^2$ of platinum was kept thereon, and that drying was carried out at 60° C. for 10 minutes and vacuum drying was then carried out at 120° C., so as to form a catalyst layer 5.

Thereafter, to examine the power generation efficiency of the polymer electrolyte fuel cell of the present comparative example, the change of the voltage to the current density was measured. The results are shown in FIG. 12.

FIG. 12 clearly shows that the polymer electrolyte fuel cell of Example 9 had the same power generation efficiency as that of the polymer electrolyte fuel cell of Comparative example 6, while using an amount of platinum that was smaller than that of Comparative example 6.

INDUSTRIAL APPLICABILITY

The present invention can be used as a polymer electrolyte fuel cell, which is used in vehicles and the like.

The invention claimed is:

1. A polymer electrolyte fuel cell comprising a pair of electrodes consisting of an oxygen electrode and a fuel electrode both having a catalyst layer containing a catalyst and an ion conductive material, and a polymer electrolyte membrane sandwiched between the catalyst layers of the both electrodes, characterized in that said polymer electrolyte membrane or said ion conductive material contained in the catalyst layer of at least one of said electrodes comprises a sulfonated polyarylene that is a copolymer consisting of 30 to 95 mol % of an aromatic compound unit represented by the following formula (1) and 70 to 5 mol % of an aromatic compound unit represented by the following formula (2) and having sulfonic acid side-chain groups:

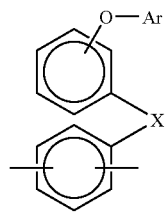

(1)

wherein Ar represents an aryl group, and X represents a divalent electron-attracting group selected from a group consisting of —CO—, —CONH—, —(CF$_2$)$_p$— (wherein p is an integer of 1 to 10, —C(CF$_3$)—, —COO—, —SO— and —SO$_2$—; and

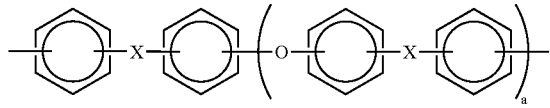
(2)

wherein X has the same meaning as that in formula (1), each of X may be identical or different, and a is an integer of 0 to 3.

2. The polymer electrolyte fuel cell according to claim 1, characterized in that said polymer electrolyte membrane comprises a sulfonated polyarylene having sulfonic acid side-chain groups and a dynamic viscoelastic coefficient at 110° C. in a range of $1 \times 10^9$ to $1 \times 10^{11}$ Pa; and said catalyst layer comprises catalyst particles consisting of a catalyst carrier and catalyst supported by said catalyst carrier, integrated by an ion conducting binder with a dynamic viscoelastic coefficient at 110° C. smaller than that of said polymer electrolyte membrane.

3. The polymer electrolyte fuel cell according to claim 1, characterized in that said polymer electrolyte membrane comprises a sulfonated polyarylene represented by the following formula (3):

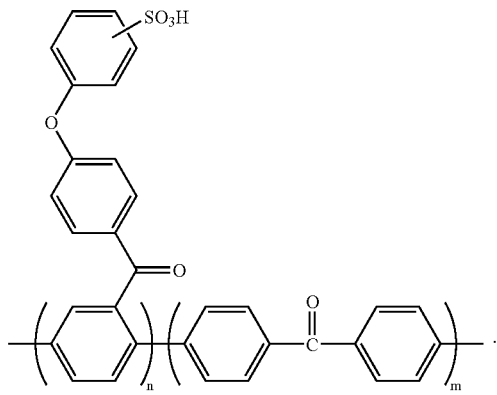
(3)

4. The polymer electrolyte fuel cell according to any one of claims 2 to 3, characterized in that the dynamic viscoelastic coefficient at 110° C. of said ion conducting binder is within a range from 1/2 to 1/1000 of that of said polymer electrolyte membrane.

5. The polymer electrolyte fuel cell according to claim 2, characterized in that said ion conducting binder comprises a sulfonated polyarylene that is a copolymer consisting of 50 to 70 mol % of an aromatic compound unit represented by the following formula (1) and 50 to 30 mol % of an aromatic compound unit represented by the following formula (4) and having sulfonic acid side-chain groups:

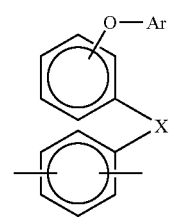
(1)

wherein Ar represents an aryl group, and X represents a divalent electron-attracting group selected from a group consisting of —CO—, —CONH—, —(CF$_{2p}$)— (wherein p is an integer of 1 to 10), —C(CF$_3$)—, —COO—, —SO— and —SO$_2$—; and

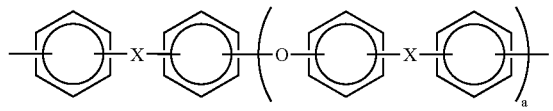
(4)

wherein X has the same meaning as that in formula (1), each of X may be identical or different, and a is an integer of 2 or greater.

6. The polymer electrolyte fuel cell according to claim 5, characterized in that said ion conducting binder comprises a sulfonated polyarylene represented by the following formula (5):

(5)

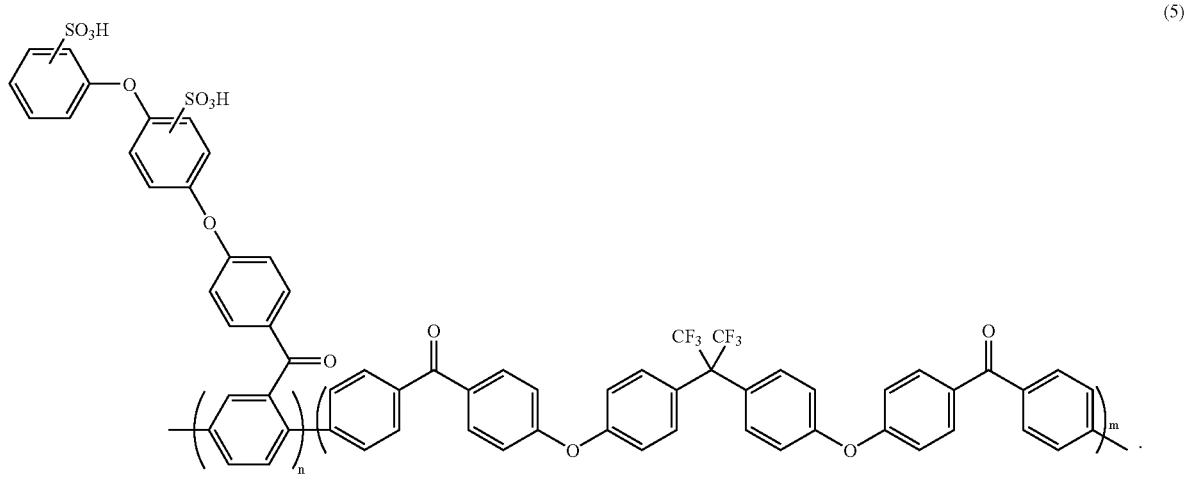

7. The polymer electrolyte fuel cell according to claim 2, characterized in that said ion conducting binder comprises a sulfonated polyether ether ketone represented by the following formula (6):

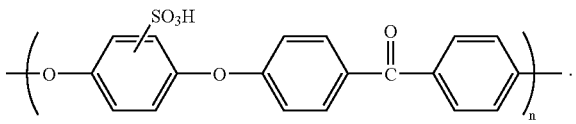

(6)

8. The polymer electrolyte fuel cell according to claim 2, characterized in that said ion conducting binder comprises a sulfonated polyether ether ketone represented by the following formula (7):

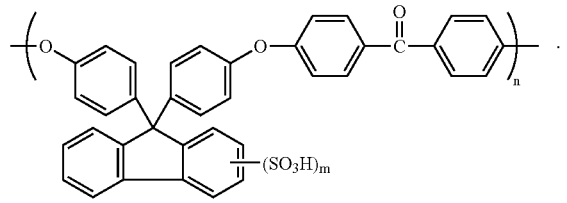

(7)

9. The polymer electrolyte fuel cell according to claim 2, characterized in that said ion conducting binder comprises a perfluoroalkylene sulfonic acid polymer.

10. The polymer electrolyte fuel cell according to claim 1, characterized in that said catalyst layer comprises catalyst particles consisting of a catalyst carrier and a catalyst supported by the catalyst carrier, integrated by an ion conducting binder; and that said ion conducting binder comprises a sulfonated polyarylene that is a copolymer consisting of 30 to 95 mol % of an aromatic compound unit represented by the following formula (1) and 70 to 5 mol % of an aromatic compound unit represented by the following formula (2) and having sulfonic acid side-chain groups:

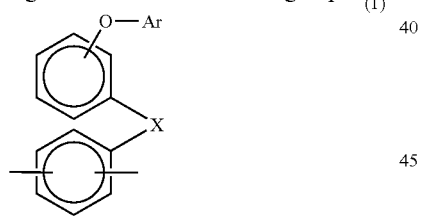

(1)

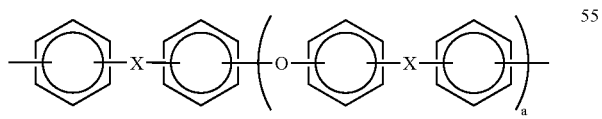

wherein Ar represents an aryl group, and X represents a divalent electron-attracting group selected from a group consisting of —CO—, —CONH—, —(CF$_2$)$_p$— (wherein p is an integer of 1 to 10), —C(CF3)—, —COO—, —SO— and —SO$_2$—; and (2)

wherein X has the same meaning as that in formula (1), each of X may be identical or different, and a is an integer of 0 to 3.

11. The polymer electrolyte fuel cell according to claim 10, characterized in that said ion conducting binder comprises 15 to 40% by weight of water under the environment of a temperature of 800C and a relative humidity of 90%.

12. The polymer electrolyte fuel cell according to claim 10 or 11, characterized in that said ion conducting binder has an ion exchange capacity of 1.9 to 2.4 meq/g.

13. The polymer electrolyte fuel cell according to claim 10, characterized in that said ion conducting binder coats 80 m$_2$/g or more of the surface area of the catalyst supported by said catalyst carrier.

14. The polymer electrolyte fuel cell according to claim 10, characterized in that said ion conducting binder comprises a sulfonated polyarylene represented by the following formula (3):

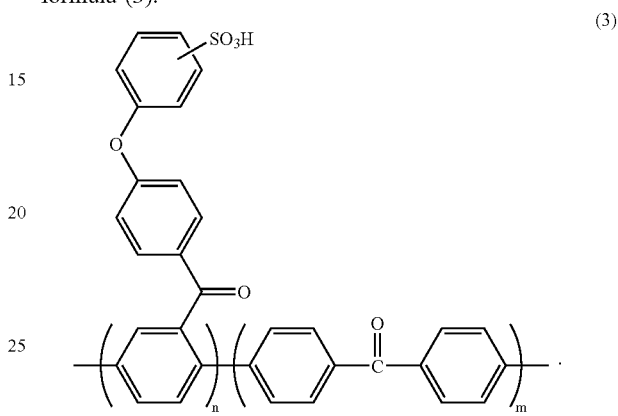

(3)

15. The polymer electrolyte fuel cell according to claim 10, characterized in that said polymer electrolyte membrane comprises a sulfonated polyarylene that is a copolymer consisting of 30 to 95 mol % of an aromatic compound unit represented by the following formula (1) and 70 to 5 mol % of an aromatic compound unit represented by the following formula (2) and having sulfonic acid side-chain groups:

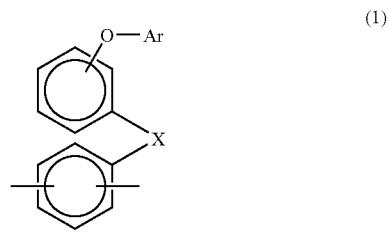

(1)

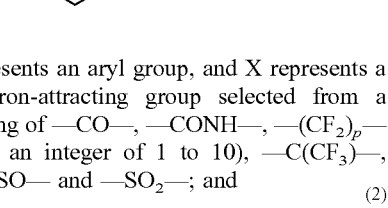

wherein Ar represents an aryl group, and X represents a divalent electron-attracting group selected from a group consisting of —CO—, —CONH—, —(CF$_2$)$_p$— (wherein p is an integer of 1 to 10), —C(CF$_3$)—, —COO—, —SO— and —SO$_2$—; and (2)

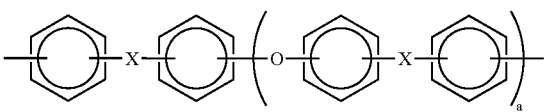

wherein X has the same meaning as that in formula (1), each of X may be identical or different, and a is an integer of 0 to 3.

16. The polymer electrolyte fuel cell according to claim 15, characterized in that said polymer electrolyte membrane comprises a sulfonated polyarylene represented by the following formula (3):

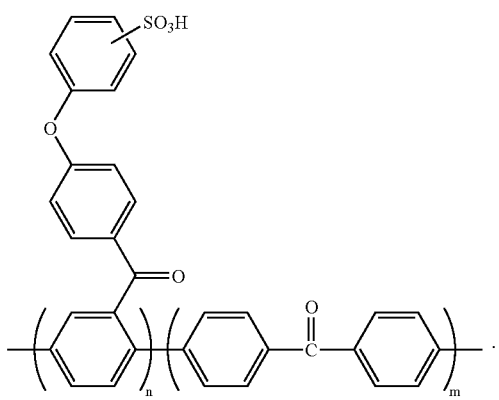

(3)

17. The polymer electrolyte fuel cell according to claim 10, characterized in that said catalyst carrier is carbon black having a specific surface area of 800 m²/g or more.

18. The polymer electrolyte fuel cell according to claim 1, characterized in that said catalyst layer comprises catalyst particles consisting of a catalyst carrier and a catalyst supported by the catalyst carrier, integrated by an ion conducting binder, and that said ion conducting binder comprises a sulfonated polyarylene that is a copolymer consisting of 30 to 95 mol % of an aromatic compound unit represented by the following formula (1) and 70 to 5 mol % of an aromatic compound unit represented by the following formula (4) and having sulfonic acid side-chain groups;
  wherein said catalyst carrier is a porous body that is formed by pores with a diameter of 100 nm or shorter, having a pore volume of from 1.0 to 1.5 ml/g:

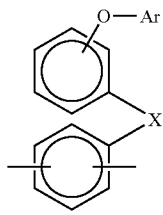

(1)

wherein Ar represents an aryl group, and X represents a divalent electron-attracting group selected from a group consisting of —CO—, —CONH—, —(CF$_2$)$_p$— (wherein p is an integer of 1 to 10), —C(CF$_3$)—, —COO—, —SO— and —SO$_2$—; and

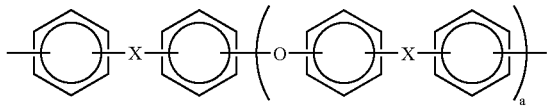

(4)

wherein X has the same meaning as that in formula (1), each of X may be identical or different, and a is an integer of 2 or greater.

19. The polymer electrolyte fuel cell according to claim 18, characterized in that said ion conducting binder has an ion exchange capacity of 1.7 to 2.2 meq/g.

20. The polymer electrolyte fuel cell according to claim 18 or 19, characterized in that said ion conducting binder comprises a sulfonated polyarylene represented by the following formula (5):

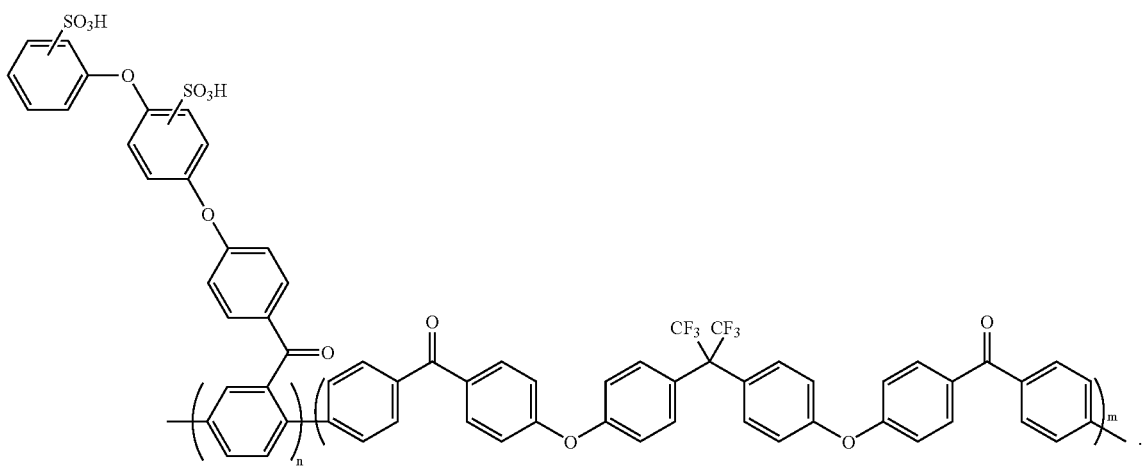

(5)

21. The polymer electrolyte fuel cell according to claim 18, characterized in that said polymer electrolyte membrane comprises a sulfonated polyarylene that is a copolymer consisting of 30 to 95 mol % of an aromatic compound unit represented by the following formula (1) and 70 to 5 mol % of an aromatic compound unit represented by the following formula (2) and having sulfonic acid side-chain groups:

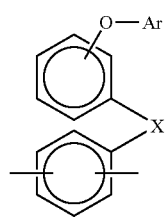

(1)

wherein Ar represents an aryl group, and X represents a divalent electron-attracting group selected from a group consisting of —CO—, —CONH—, —(CF$_2$)$_p$— (wherein p is an integer of 1 to 10), —C(CF$_3$)—, —COO—, —SO— and —SO$_2$—; and

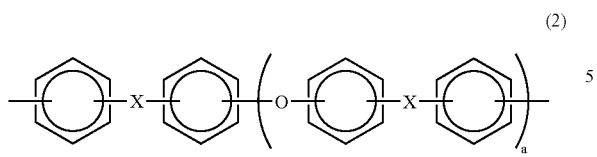
(2)

wherein X has the same meaning as that in formula (1), each of X may be identical or different, and a is an integer of 0 to 3.

22. The polymer electrolyte fuel cell according to claim 21, characterized in that said polymer electrolyte membrane comprises a sulfonated polyarylene represented by the following formula (3):

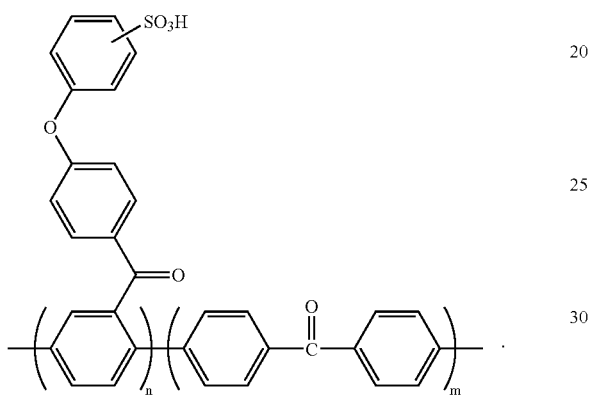
(3)

23. The polymer electrolyte fuel cell according to claim 1, characterized in that:
said catalyst layer comprises catalyst particles consisting of a catalyst carrier and a catalyst supported by the catalyst carrier, integrated by an ion conducting binder;
the ion conducting binder forming the catalyst layer of said oxygen electrode comprises a perfluoroalkylene sulfonic acid polymer; and
the ion conducting binder forming the catalyst layer of said fuel electrode comprises a sulfonated polyarylene that is a copolymer consisting of 30 to 95 mol % of an aromatic compound unit represented by the following formula (1) and 70 to 5 mol % of an aromatic compound unit represented by the following formula (2) and having sulfonic acid side-chain groups:

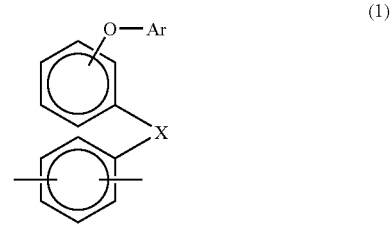
(1)

wherein Ar represents an aryl group, and X represents a divalent electron-attracting group selected from a group consisting of —CO—, —CONH—, —(CF$_2$)$_p$— (wherein p is an integer of 1 to 10), —C(CF$_3$)$_2$—, —COO—, —SO— and —SO$_2$—; and

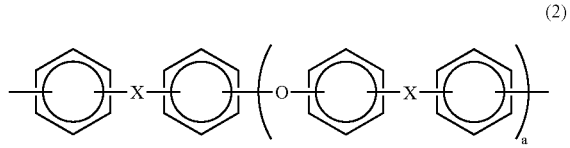
(2)

wherein X has the same meaning as that in formula (1), each of X may be identical or different, and a is an integer of 0 to 3.

24. The polymer electrolyte fuel cell according to claim 23, characterized in that the ion conducting binder forming the catalyst layer of said fuel electrode has an ion exchange capacity of 1.9 to 2.4 meq/g.

25. The polymer electrolyte fuel cell according to claim 23 or 24, characterized in that the ion conducting binder forming the catalyst layer of said fuel electrode comprises a sulfonated polyarylene represented by the following formula (5):

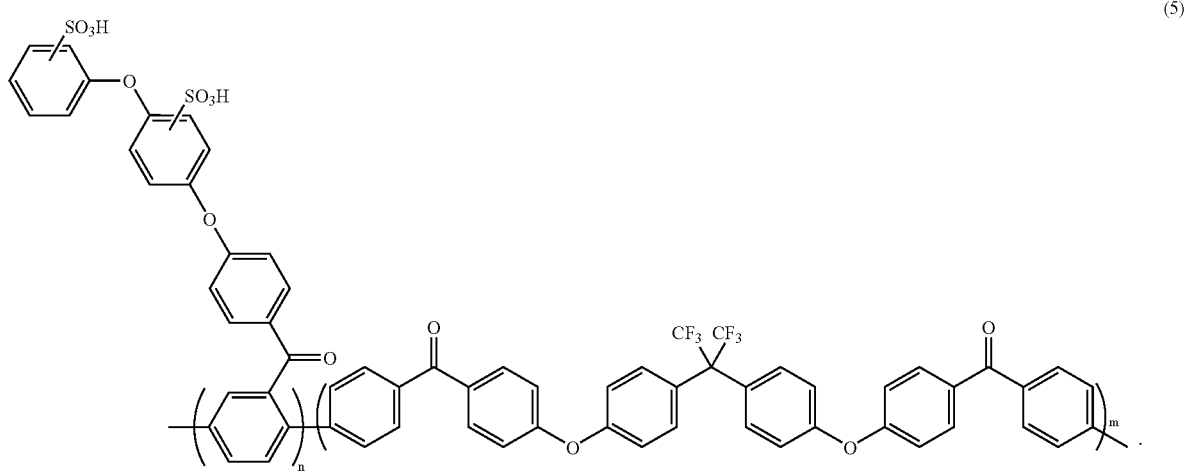
(5)

26. The polymer electrolyte fuel cell according to claim 23, characterized in that the ion conducting binder forming the catalyst layer of said oxygen electrode has an ion exchange capacity of 0.8 to 1.0 meq/g.

27. The polymer electrolyte fuel cell according to claim 23, characterized in that said polymer electrolyte membrane comprises a sulfonated polyarylene that is a copolymer consisting of 30 to 95 mol % of an aromatic compound unit represented by the following formula (1) and 70 to 5 mol % of an aromatic compound unit represented by the following formula (2) and having sulfonic acid side-chain groups:

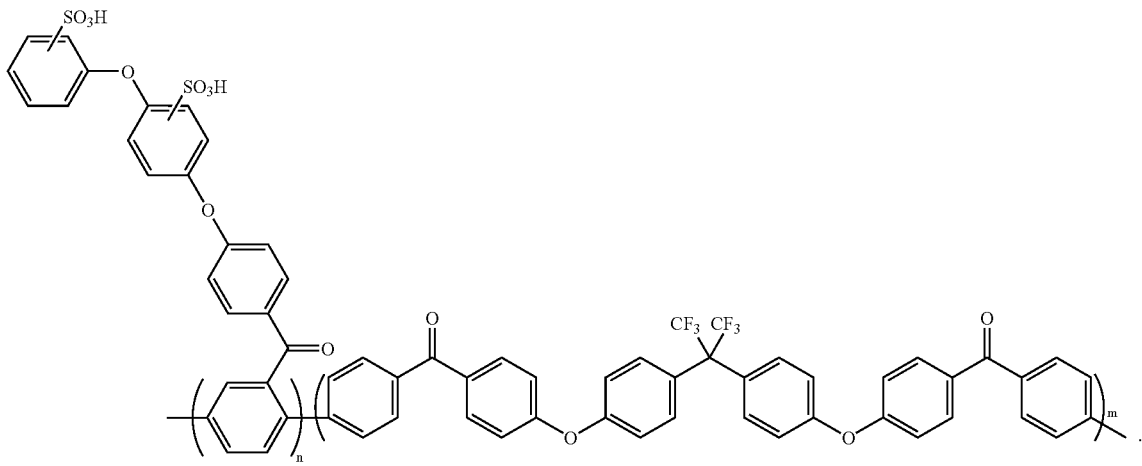

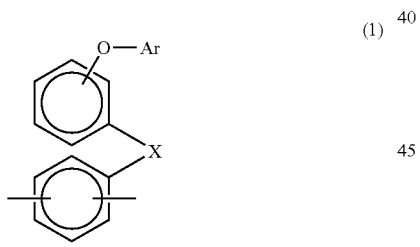

wherein Ar represents an aryl group, and X represents a divalent electron-attracting group selected from a group consisting of —CO—, —CONH—, —(CF$_2$)$_p$— (wherein p is an integer of 1 to 10), —C(CF$_3$)—, —COO—, —SO— and —SO$_2$—; and wherein X has the same meaning as that in formula (1), each of X may be identical or different, and a is an integer of 0 to 3.

28. The polymer electrolyte fuel cell according to claim 27, characterized in that said polymer electrolyte membrane comprises a sulfonated polyarylene represented by the following formula (5):

(5)

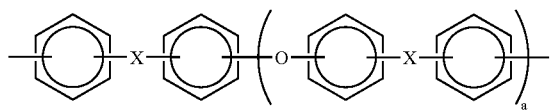

29. The polymer electrolyte fuel cell according to claim 1, characterized in that:

said catalyst layer comprises catalyst particles consisting of a catalyst carrier and a catalyst supported by the catalyst carrier, integrated by an ion conducting binder;

the ion conducting binder forming the catalyst layer of said oxygen electrode comprises a sulfonated polyarylene that is a copolymer consisting of 30 to 95 mol % of the aromatic compound unit represented by the formula (1) and 70 to 5 mol % of the aromatic compound unit represented by the formula (2) and having sulfonic acid side-chain groups; and the ion conducting binder forming the catalyst layer of said fuel electrode comprises a perfluoroalkylene sulfonic acid polymer.

30. The polymer electrolyte fuel cell according to claim 29, characterized in that the ion conducting binder forming the catalyst layer of said oxygen electrode has an ion exchange capacity of 1.9 to 2.4 meq/g.

31. The polymer electrolyte fuel cell according to claim 29 or 30, characterized in that the ion conducting binder forming the catalyst layer of said oxygen electrode comprises a sulfonated polyarylene represented by the following formula (5):

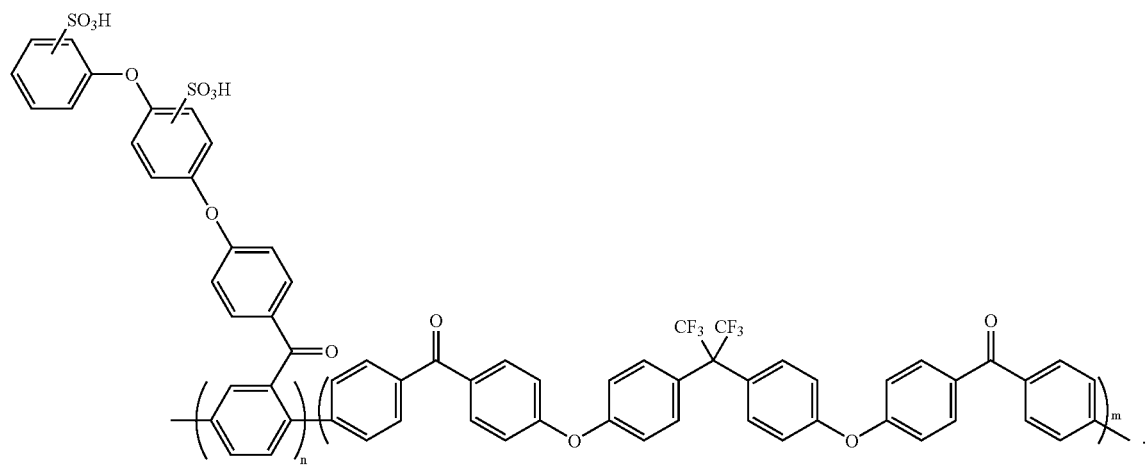
(5)

32. The polymer electrolyte fuel cell according to claim 29, characterized in that the ion conducting binder forming the catalyst layer of said fuel electrode has an ion exchange capacity of 0.8 to 1.0 meq/g.

33. The polymer electrolyte fuel cell according to claim 29, characterized in that said polymer electrolyte membrane comprises a sulfonated polyarylene that is a copolymer consisting of 30 to 95 mol % of an aromatic compound unit represented by the following formula (1) and 70 to 5 mol % of an aromatic compound unit represented by the following formula (2) and having sulfonic acid side-chain groups:

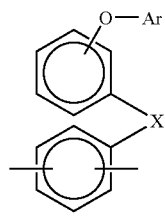
(1)

wherein Ar represents an aryl group, and X represents a divalent electron-attracting group selected from a group consisting of —CO—, —CONH—, —(CF$_2$)$_p$— (wherein p is an integer of 1 to 10), —C(CF$_3$)$_2$—, —COO—, —SO— and —SO$_2$—; and

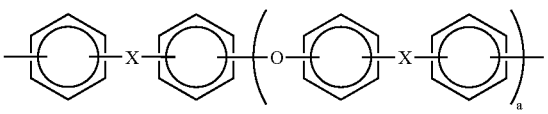
(2)

wherein X has the same meaning as that in formula (1), each of X may be identical or different, and a is an integer of 0 to 3.

34. The polymer electrolyte fuel cell according to claim 33, characterized in that said polymer electrolyte membrane comprises a sulfonated polyarylene represented by the following formula (5):

(5)

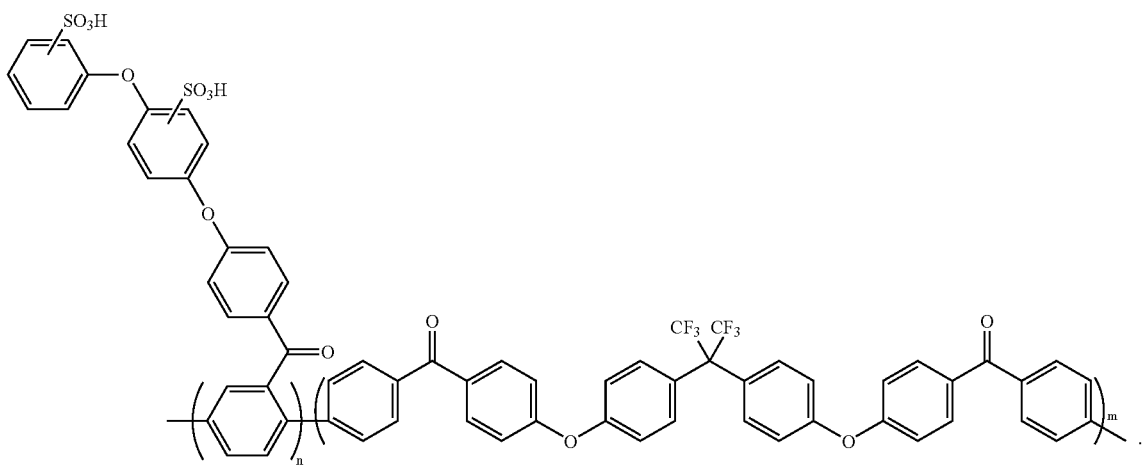

35. The polymer electrolyte fuel cell according to claim 1, characterized in that said catalyst layer comprises an ion conducting material comprising a sulfonated polyarylene having sulfonic acid side-chain groups; and a catalyst generated by subjecting the hydrogen ions of said sulfonic acid groups of said sulfonated polyarylene to ion exchange with catalyst ions and then reducing said catalyst ions, and being supported by said ion conducting material.

36. The polymer electrolyte fuel cell according to claim 35, characterized in that said ion exchange is carried out by immersing said ion conducting material into a solution comprising a noble metal complex as a catalyst and at least one additive selected from a group consisting of an aqueous organic solvent, a nonionic surfactant and a non-metallic base.

37. The polymer electrolyte fuel cell according to claim 35 or 36, characterized in that said ion conducting material comprises a sulfonated polyarylene that is a copolymer consisting of 30 to 95 mol % of an aromatic compound unit represented by the following formula (1) and 70 to 5 mol % of an aromatic compound unit represented by the following formula (2) and having sulfonic acid side-chain groups:

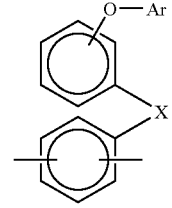
(1)

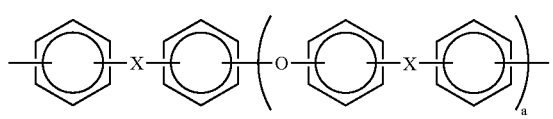
(2)

wherein Ar represents an aryl group, and X represents a divalent electron-attracting group selected from a group consisting of —CO—, —CONH—, —(CF$_2$)$_p$— (wherein p is an integer of 1 to 10), —C(CF$_3$)—, —COO—, —SO— and —SO$_2$—; and wherein X has the same meaning as that in formula (1), each of X may be identical or different, and a is an integer of 0 to 3.

38. The polymer electrolyte fuel cell according to claim 37, characterized in that said ion conducting material comprises a sulfonated polyarylene represented by the following formula (5):

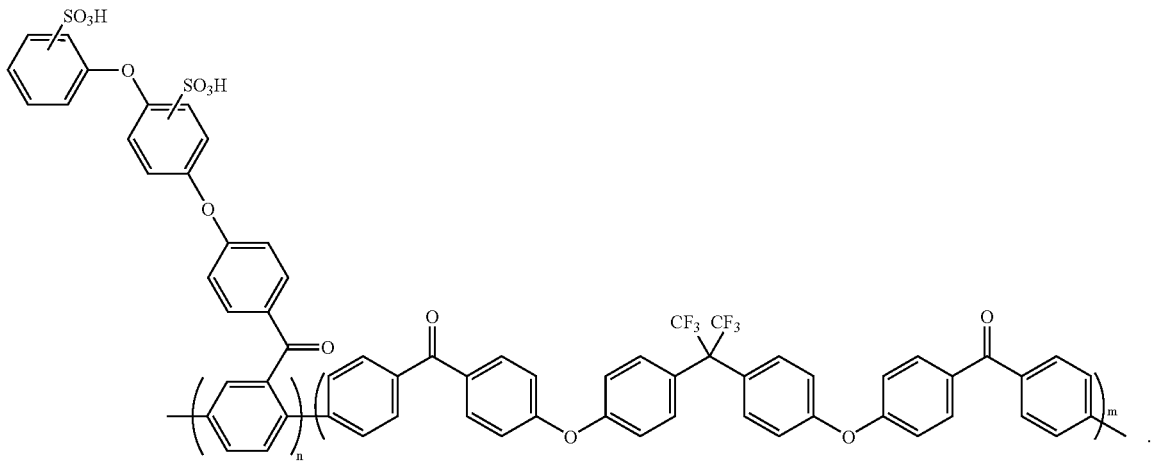
(5)

39. The polymer electrolyte fuel cell according to claim 35, characterized in that said polymer electrolyte membrane comprises a sulfonated polyarylene that is a copolymer consisting of 30 to 95 mol % of an aromatic compound unit represented by the following formula (1) and 70 to 5 mol % of an aromatic compound unit represented by the following formula (2) and having sulfonic acid side-chain groups:

(1)

wherein Ar represents an aryl group, and X represents a divalent electron-attracting group selected from a group consisting of —CO—, —CONH—, —(CF$_2$)$_p$— (wherein p is an integer of 1 to 10), —C(CF$_3$)—, —COO—, —SO— and —SO$_2$—; and (2)

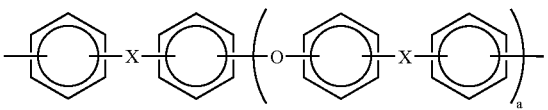

wherein X has the same meaning as that in formula (1), each of X may be identical or different, and a is an integer of 0 to 3.

40. The polymer electrolyte fuel cell according to claim 39, characterized in that said polymer electrolyte membrane comprises a sulfonated polyarylene represented by the following formula (5):

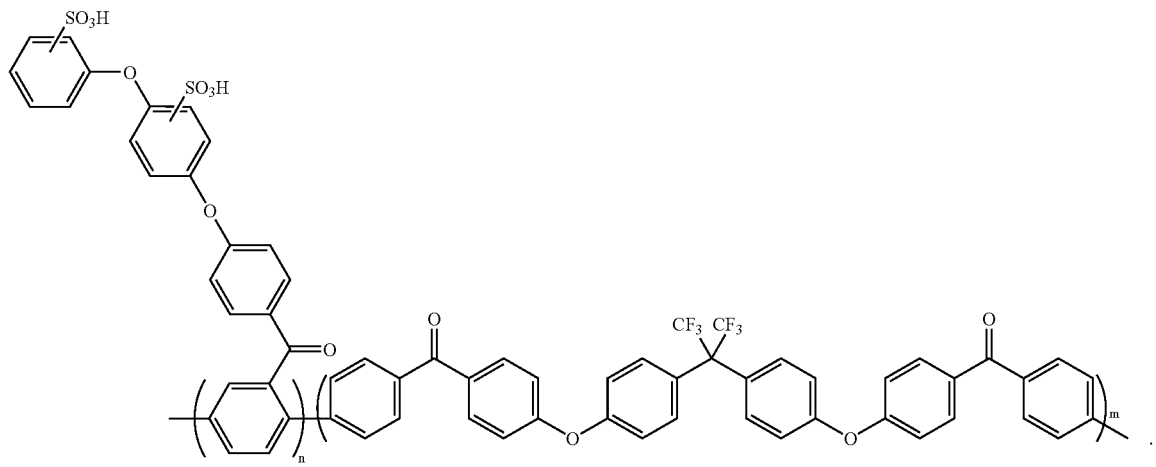
(5)
* * * * *